(12) United States Patent
Matsuda et al.

(10) Patent No.: US 6,687,420 B1
(45) Date of Patent: *Feb. 3, 2004

(54) IMAGE READING APPARATUS

(75) Inventors: Shinya Matsuda, Kyoto (JP); Noriyuki Okisu, Osakasayama (JP); Hiroshi Nagashima, Atsugi (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1017 days.

(21) Appl. No.: 08/530,434

(22) Filed: Sep. 19, 1995

(30) Foreign Application Priority Data

Sep. 21, 1994 (JP) ............................... 6-254807

(51) Int. Cl.⁷ .................................. G06K 9/36
(52) U.S. Cl. ........................ 382/286; 355/25; 355/82; 358/449; 358/488; 382/199; 382/291; 382/203; 399/362
(58) Field of Search ................. 382/199, 203, 382/275, 316, 317, 319, 106, 286, 291, 293; 399/362; 358/449, 474, 488; 356/373, 384; 250/202; 355/25, 82; 345/421, 422; 707/520–521; 715/520–521

(56) References Cited

U.S. PATENT DOCUMENTS

| | | | |
|---|---|---|---|
| 4,577,302 A | * 3/1986 | Allen | 369/46 |
| 4,654,706 A | * 3/1987 | Davidson et al. | 348/190 |
| 4,659,207 A | * 4/1987 | Maekawa | 355/8 |
| 4,980,720 A | * 12/1990 | Siegel | 355/233 |
| 5,084,611 A | * 1/1992 | Okisu et al. | 250/208.1 |
| 5,194,729 A | * 3/1993 | Okisu et al. | 250/222.1 |
| 5,206,771 A | * 4/1993 | Katou et al. | 360/71 |
| 5,276,530 A | * 1/1994 | Siegel | 358/406 |
| 5,416,609 A | * 5/1995 | Matsuda et al. | 358/474 |
| 5,497,236 A | * 3/1996 | Wolff et al. | 358/296 |
| 5,583,662 A | * 12/1996 | Takahashi et al. | 358/474 |
| 5,585,926 A | * 12/1996 | Fujii et al. | 358/471 |

FOREIGN PATENT DOCUMENTS

| | | |
|---|---|---|
| JP | 60-254869 | 12/1985 |
| JP | 61-265960 | 11/1986 |
| JP | 4-238457 | 8/1992 |

* cited by examiner

Primary Examiner—Timothy M. Johnson
(74) Attorney, Agent, or Firm—Sidley Austin Brown & Wood LLP

(57) ABSTRACT

In an image reading apparatus in which a document is read with scanning by a image pickup device, a height of the document and an outline of the document are detected. Based on the detected height and outline data, together with a calculating of a document size, an offset amount from a setting reference position of the document is calculated. Based on the calculations, the image is processed properly. Also, if the document is not placed correctly or a degree of an image distortion is not within a correctable range, an alarm is issued.

33 Claims, 27 Drawing Sheets

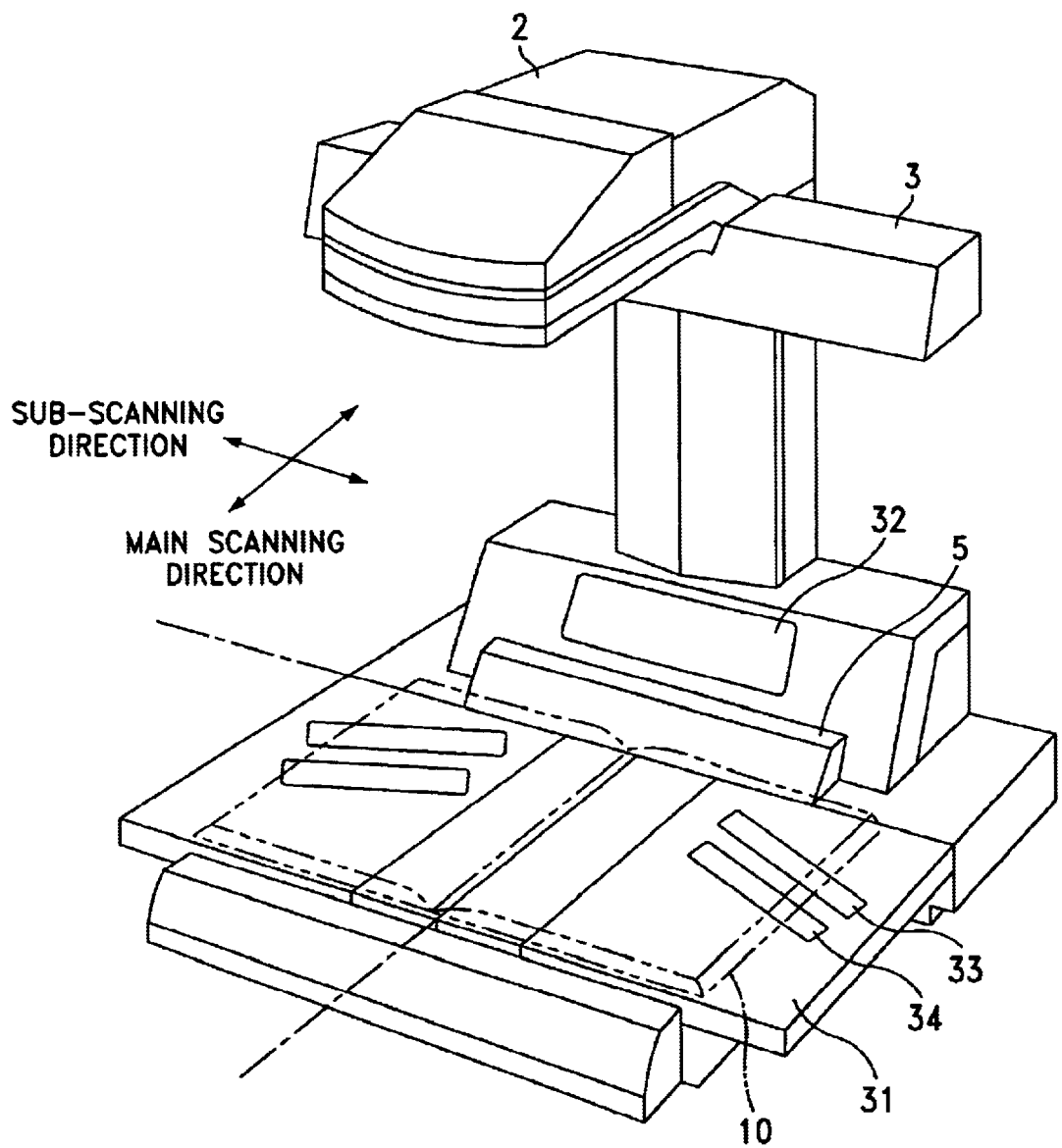
F I G. 16

$a = L1x - L2x$
$b = L1y - L2y$
$\theta = \tan^{-1}(b/a)$
$\theta$: document deflection angle F I G. 26
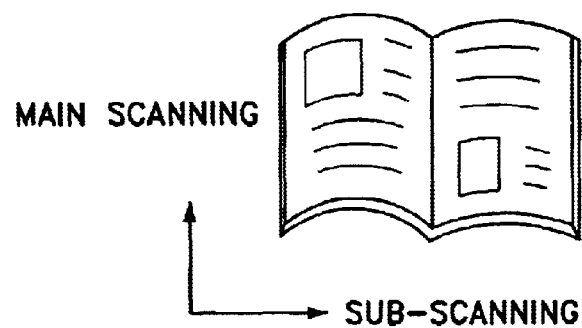
F I G. 27
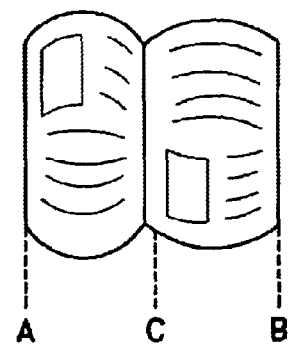
A     C     B
F I G. 28
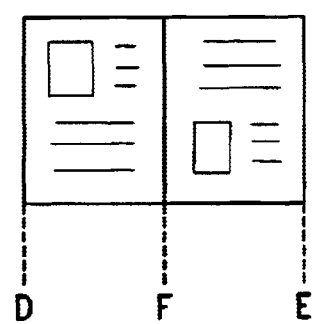
D     F     E F I G. 29
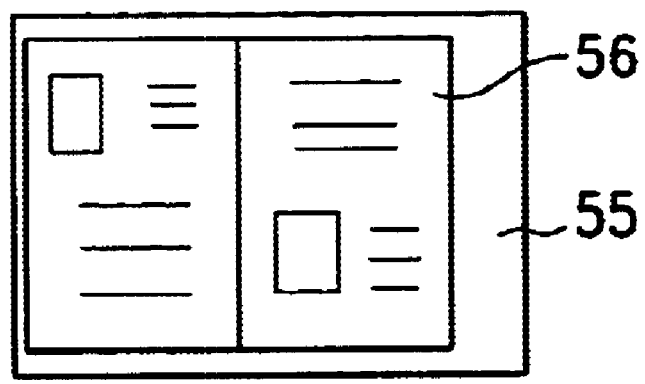
F I G. 30
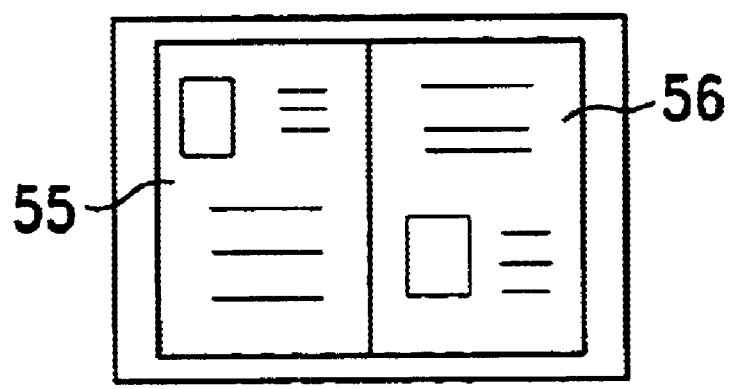

IMAGE READING APPARATUS

BACKGROUND OF THE INVENTION

1. Field of the Invention

The present invention relates to an image reading apparatus in which an image of a book document and so on is picked up, wherein an outline of a document and a distance to a document surface is detected, a size of the document and an offset amount from a reference position of placement are found and an appropriate image reading operation is executed.

2. Description of the Prior Art

Conventionally, regard to an image reading apparatus in which a document is read with face down, there has been known an apparatus wherein a size of the document is recognized by detecting a difference of a density between a back of a cover for holding the document and a document surface. Also, regard to an image reading apparatus in which a document is read with face up, there has been known an apparatus wherein, in the case of a book document or the like of which its surface exhibits a spacial curve, a height distance to the document surface is detected and, based on the detected, height distance, an image distortion is corrected. Similarly, there has been known an image reading apparatus wherein an edge of an upper end of a document surface with face up is picked up and, together with recognizing an outline by detecting a difference of brightness between the surface and a background focus detecting plate, a height of the document is detected, and, based on the detected height, the read image is corrected (for example, refer to Japanese Laid-Open Patent Publication No.60-254869). Also, according to a technique upon correcting an image distortion caused by reading an image of a curved document, there has been know an apparatus wherein linear light is emitted to a document surface at a specified angle, the projected image is picked up to detect a curvature of the document and in accordance with the curvature the read image is corrected.

However, according to the above-mentioned image reading apparatus in which the document is set with face down, in the case of using a document having a thickness such as a book document, since a cover for holding the document can not be closed, as the result, a problem occurs that a size of the document can not be detected. Also, according to the image reading apparatus in which the document is set with face up, if the read outline dimension of the document is used as the size of the document without correction, by influence of the height of the document, a problem occurs that it is measured larger than the actual size of the document. Furthermore, according to the image reading apparatus as stated above wherein a height of the document is obtained from a read image of the document, in cases in which the document is not placed correctly on a document table or the document has a large cover, when an edge of an upper end of a document surface is put apart from a reference position, accurate height data can not be given, so that a reproduced image quality may have defects. Also, in correcting an image distortion, if the degree of the image distortion exceeds a predetermined limit, since it can not be corrected appropriately, image pick up is not executed perfectly.

SUMMARY OF THE INVENTION

The present invention is made to solve the above-mentioned problems. An object of the present invention is to provide an image reading apparatus in which a document is optically scanned and image pickup is executed, and a document size is obtained by measuring an outline of a document and a distance (height) to the document, and then an appropriate selection of an optimum paper/magnification and erasing of an image of a portion irrelevant to the document can be achieved. Another object of the present invention is to provide an image reading apparatus in which detected data of height of the document is corrected or, an image pickup error is prevented by informing an operator that the document is not placed correctly, by detecting a document setting position (offset amount from a reference setting position) or judging whether or not a degree of an image distortion is within a correctable range.

In accomplishing the above-mentioned objects, according to the present invention, an image pickup device reads a document placed on a document table with scanning and a height detecting means detects a height of the document. An outline measuring means detects an edge portion of a document surface from the image read by the image pickup device and, based on detected result, an outline of the document is obtained. Based on data of the height of the document detected by the above-mentioned operation and data of the outline of the document measured by the outline measuring means, a calculating means calculates a document size. By selecting optimum paper/magnification and erasing a portion of an image irrelevant to the document in accordance with the calculated document size, it is able to pickup the image appropriately.

Further, according to the present invention, an image pickup device reads a document placed on a document table, a height detecting means detects a height of the document, and a document position recognizing means recognizes a position that the document is placed by the image data read by the image pickup device. In accordance with the recognized position of the document, a correcting means corrects detected data of the height of the document. By use of the corrected data of the height of the document, the read image is properly processed and, when the document is put apart from a reference position of placement over a predetermined value, it is possible to inform an operator that the document is not placed correctly or to stop an image pickup operation temporarily.

Furthermore, according to the present invention, an image pickup device reads a document placed on a document table with scanning, and an, image distortion detecting means detects a degree of an image distortion attributed to a configuration of the document. A correcting means corrects the image distortion read by the image pickup device in accordance with the detected degree of the image distortion, and a judging means judges whether or not the degree of the image distortion is within a correctable range. If the degree of the image distortion is not within the correctable range, it is possible to inform an operator that the document is not placed correctly or to stop an image pickup operation temporarily.

Still furthermore, according to the present invention, an image pickup device reads a document placed on a document table with scanning, and a detecting means detects an edge of an upper end of a document surface. A height calculating means calculates data of the height of the document based on an edge detecting result, a correcting means detects the minimum value from the obtained height data, and corrects an alteration of the document height owed to an offset amount from a document reference position, based on the minimum value. By processing the read image with use of the height data, an appropriate read image is obtained.

BRIEF DESCRIPTION OF THE DRAWINGS

FIG. 16 is a perspective view of an image reading apparatus of the second embodiment of the present invention.

FIG. 26 is a plan view showing a document where the image is centered.

FIG. 27 is a view showing an image picked up from the document.

FIG. 28 is a view showing the image subjected to curvature correction and contraction correction processes.

FIG. 29 is a view showing the image shown in FIG. 27 centered.

FIG. 30 is a view showing the image shown in FIG. 28 centered.

DETAILED DESCRIPTION OF THE PREFERRED EMBODIMENTS

Figure 1:
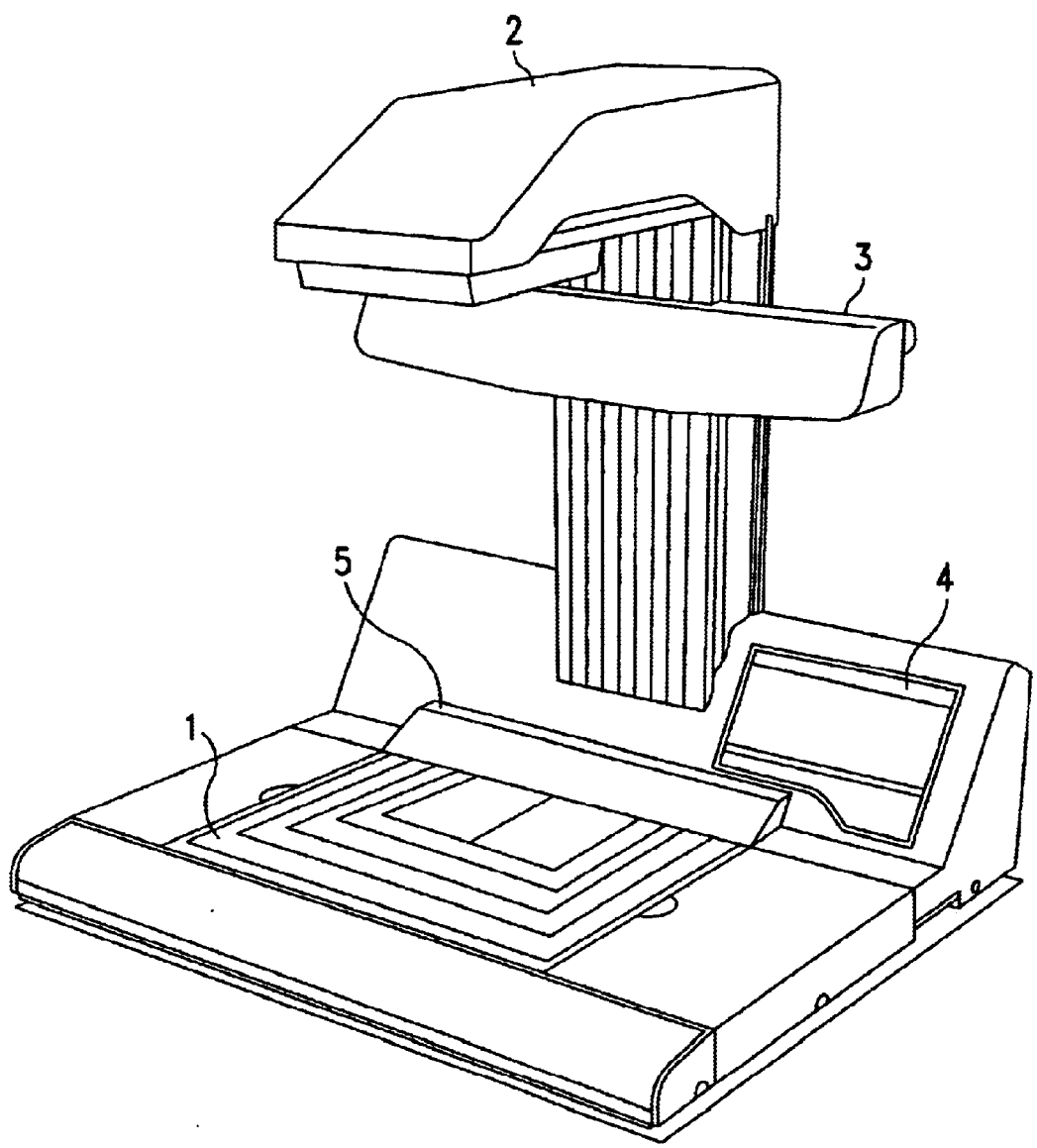
FIG. 1 is a perspective view of an image reading apparatus of the first embodiment of the present invention.

An image reading apparatus according to a first embodiment of the present invention will be described with reference to the accompanying drawings. FIG. 1 shows the overall construction of the image reading apparatus. A document such as a book file, i.e., an object is placed face up on a document table 1 of the image reading apparatus, while an image pickup camera unit 2 having an image pickup device for reading the document by optical scanning is provided above the document. The document table 1 is colored darker than the ground color of an ordinary document, so that the document surface can be discriminated from the document table in the reading stage. The apparatus comprises: an illuminating unit 3 that is arranged rearward above the document table 1 and illuminates the document; an operating unit 4 for performing setting of image reading conditions and so forth; a distance measuring mirror 5 that is arranged aslant rearward on the document table 1 and reflects an end surface edge shape of the document so as to obtain the height of the document from the reflected Image; and a controlling unit (not shown) that controls an image pickup operation by pre-scan and main scan by means of the image pickup camera unit 2. Image data picked up by the image pickup camera unit 2 is subjected to various processing operations by the controlling unit and then outputted to a desired output apparatus (printer, computer or the like).

Figure 7:
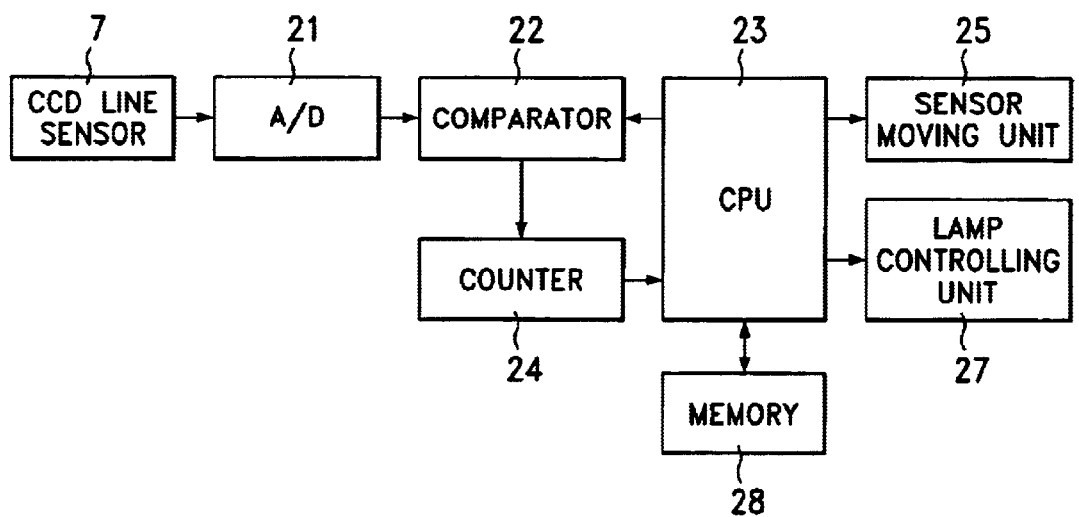
FIG. 7 is a block diagram of a circuit of the present invention.

The image pickup device of the image pickup camera unit 2 reads the end surface (edge) shape of the document reflected on the distance measuring mirror 5 through the pre-scan executed prior to the main scan, and reads illuminance nonuniformity. The controlling unit is constituted by a CPU 23 and so forth as shown in FIG. 7 described hereinafter, and comprises: distance measuring means for calculating a distance to the document, i.e., the height of the document by detecting the number of pixels of the image pickup device corresponding to the document and the document end surface portion in the reading stage through the pre-scan; outline measuring means for calculating the outline of the document according to the number of pixels; size calculating means for correcting outline data of the document based on the above-mentioned height information and calculating the size of the document; document position recognizing means for recognizing the position in which the document is placed on the document table 1; and correcting means for correcting the document height data according to an amount of separation (offset amount) of the document from a reference position in which the document is to be placed. There are further provided alarm means (not shown) such as a lamp or a buzzer for urging the operator to rearrange the placement of the document when the document position is not normal.

Figure 2:
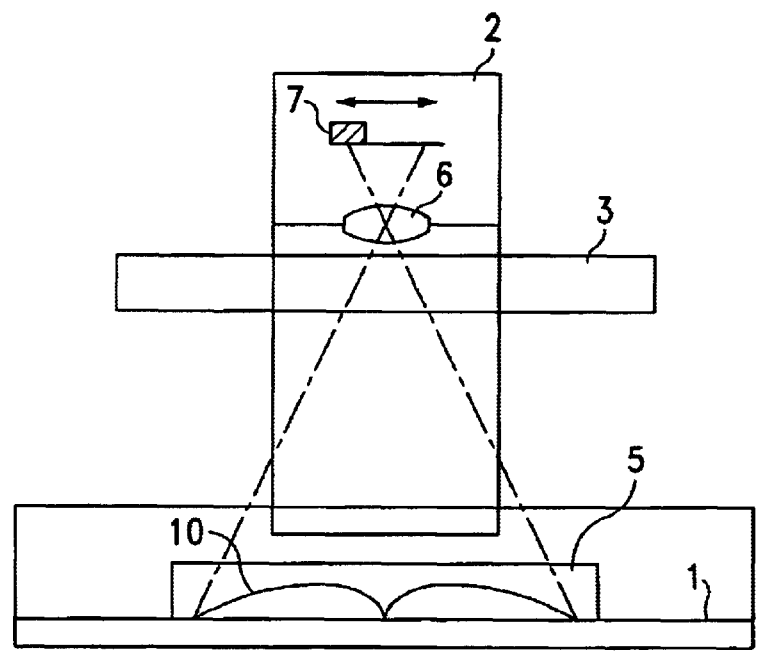
FIG. 2 is a schematic front view of the apparatus of the present invention.
Figure 3:
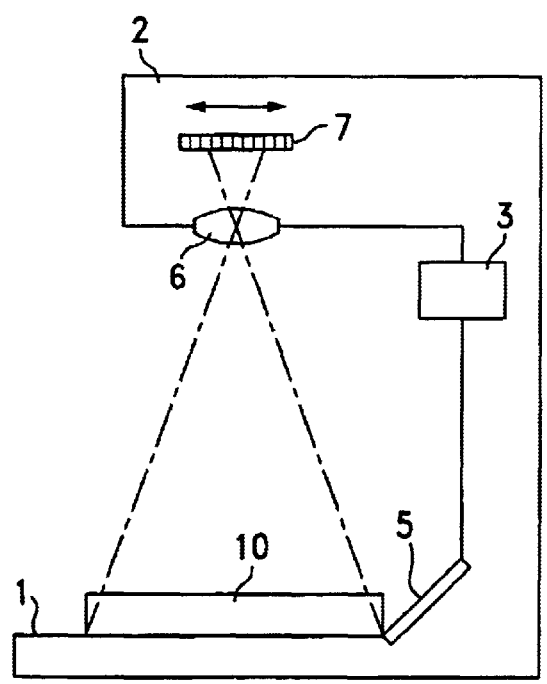
FIG. 3 is a schematic side view of the apparatus of the present invention.

FIGS. 2 and 3 show respectively a schematic front view and a schematic side view of the present apparatus. The image pickup camera unit 2 is constituted by an optical system having an image pickup lens 6 that is driven by a lens drive unit (not shown) and focuses a document image, and an image pickup device composed of a CCD line sensor 7 that moves in a sub-scanning direction (direction indicated by an arrow in FIG. 2) in a focal plane on which a document image is focused. A document 10 placed on the document table 1 is a book or the like of which document surface exhibits a spatially curved columnar configuration when a document is opened. A part of the CCD line sensor 7 reads an image of a side surface of an upper end portion of the document reflected on the distance measuring mirror 5. The distance measuring mirror 5 extends in the lateral direction at the rear side of the document table, and concurrently serves as a stopper for determining the document position as disposed aslant at an angle of 45° with respect to the surface of the document table 1. By abutting the upper end of the document 10 against a lower end portion of the distance measuring mirror 5, the position of the document 10 is aligned. Instead of providing the distance measuring mirror at the rear side, it is acceptable to provide the mirror at the front side of the document table similarly to the case where the mirror is provided at the rear side and an image of the lower end side surface of the document is read.

Figure 4:
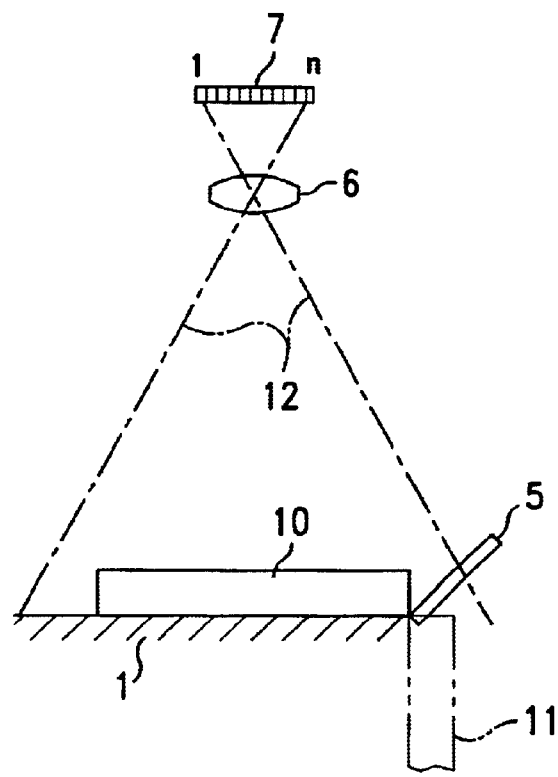
FIG. 4 is a view showing a principle of distance measuring in the present invention.

FIG. 4 shows a distance measuring principle. By placing the document 10 in a specified position, a mirror image 11 of the document 10 is formed by the distance measuring mirror 5. When the document is read by the CCD line sensor 7, the mirror image 11 of the upper end side surface of the document is formed continuously with the document image in a line extending from an image of the document table 1. It Is to be noted that a range of reading covered by the image pickup device is indicated by one-dot chain lines 12, and the image on the CCD line sensor 7 is expressed by 1 through n.

Figure 5:
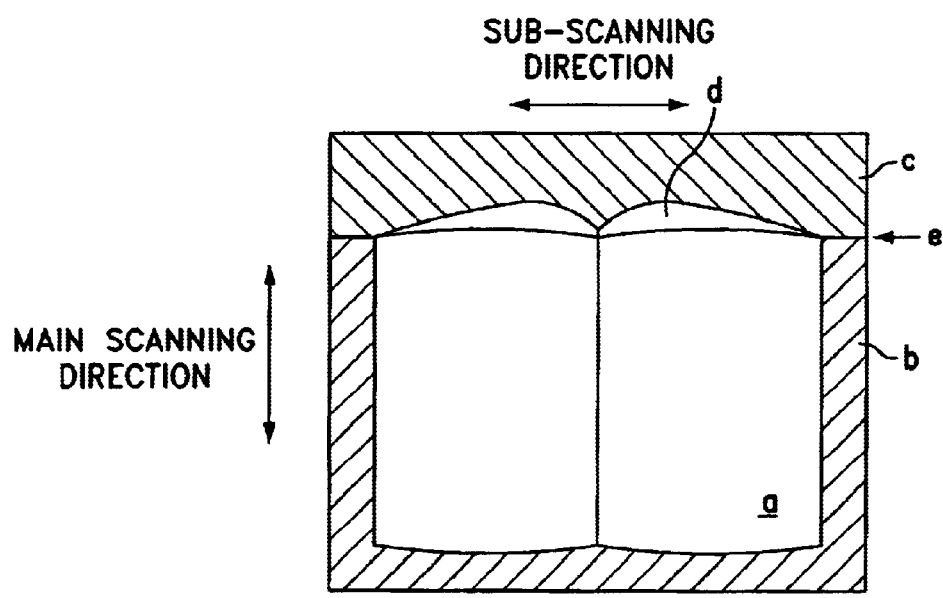
FIG. 5 is a view showing image data read by the present invention.

FIG. 5 shows the state of image data read by the image pickup camera unit 2 having the above-mentioned construction. In FIG. 5, "a" denotes a document image, "b" denotes a document table image, "c" denotes a portion reflected on the distance measuring mirror 5, "d" denotes an image of the upper end surface of the document, and "e" denotes a position alignment reference of the document. The image "d" of the upper end surface of the document is read in a manner that higher portions of the document are curved somewhat upward in FIG. 5 due to a variation in height thereof. The document and the end surface are illuminated by the illuminating unit 3, and therefore they are read totally brightly. In contrast to the above, portions which belong to the document table 1 and the distance measuring mirror 5 colored more thickly than the ground of the document and are not reflecting the upper end surface of the document receive smaller quantities of incident light, and therefore the portions are read darkly.

Figure 6:
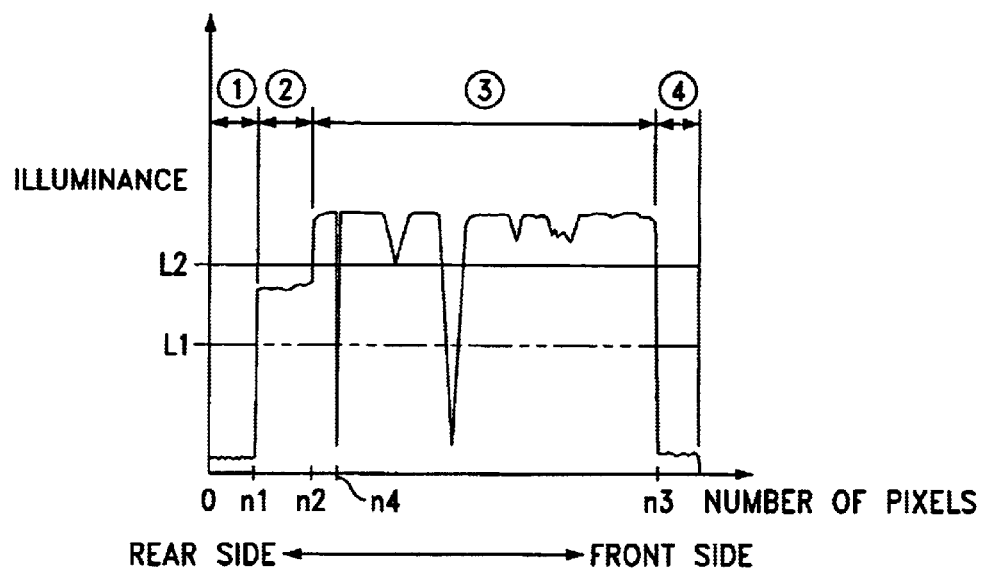
FIG. 6 is a view showing an exemplified output of one line by an image pickup device of the apparatus.

FIG. 6 shows an exemplified output of one line in a main scanning direction of the CCD line sensor 7. The number of pixels of the line sensor 7 (left: rear side, right: front side) is plotted in the axis of abscissas, while a sensor surface illuminance is plotted in the axis of ordinates. An interval (1) represents the portion in which the document end surface is not reflected on the distance measuring mirror 5, an interval (2) represents the portion of the document upper end side surface reflected on the distance measuring mirror 5, an interval (3) represents the portion of the document 10, and an interval (4) represents the portion of the document table 1. There are further denotations of: L1 representing a threshold value for deciding whether an image is present or absent on the distance measuring mirror; L2 representing a threshold value for deciding whether a document is present or absent on the document table; n1 representing the minimum value of the number of pixels exceeding the threshold value L1; n2 and n3 representing the minimum and maximum values of the number of pixels exceeding the threshold value L2; and n4 representing a pixel (fixed) corresponding to the document reference position. A value of (n4−n1) represents the number of pixels corresponding to the height of the document. Further, a value of (n3—n2) represents the number of pixels corresponding to an external dimension in the front and rear direction of the document. When the CCD line sensor 7 moves in the lateral direction (sub-scanning direction), the values of n1, n2 and n3 vary, thereby variations in height and outline dimension of the document in the lateral direction are obtained.

FIG. 7 shows a block diagram of a circuit in the controlling unit. An output (pixel data) of the CCD line sensor 7 is subjected to an analog-to-digital (A/D) conversion process every line by an A/D converter 21, and then inputted to a comparator 22. In the comparator 22 the aforementioned threshold values L1 and L2 of illuminance are preset by the CPU 23. The input data inputted to the comparator 22 is compared with the threshold values L1 and L2, and a counter 24 is reset each time when the input data exceeds the threshold values L1 and L2. Then, the minimum value n1 of a count value of the counter 24 set when the input data exceeds the threshold value L1, and the minimum value n2 and the maximum value n3 of the count value of the counter 24 set when the input data exceeds the threshold value L2 are stored in a memory 28. By executing the above-mentioned operation on each line in the sub-scanning direction, the height and the outline dimension of the document can be obtained. The CPU 23 outputs a command for focusing the CCD line sensor 7 to a sensor moving unit 25 based on the obtained height data of the document, and outputs a command for controlling a lamp controlling unit 27.

Figure 8:
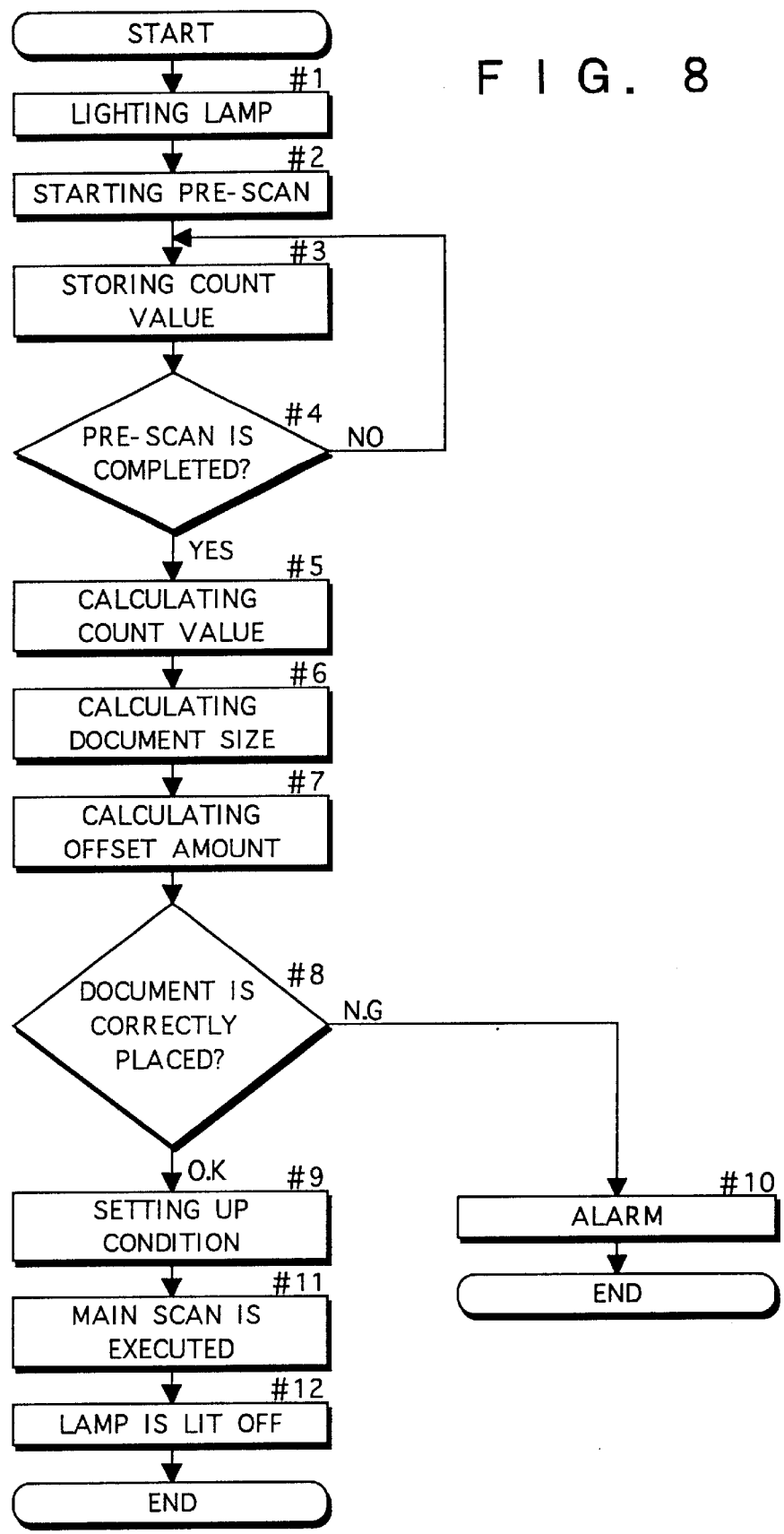
FIG. 8 is a flowchart of a reading operation of the present invention.

Next, a reading operation of the image reading apparatus constructed as above will be described with reference to a flowchart of FIG. 8. When a reading operation start command is inputted from the operating unit 4, the CPU 23 makes a lamp of the illuminating unit 3 light via the lamp controlling unit 27 to illuminate the document 10 (step #1). Then, the pre-scan, is started (step #2) to execute a document shape measuring operation. This operation is executed by picking up the images of the document upper end side surface portion reflected on the distance measuring mirror 5 and the document 10 on the document table 1 while moving the CCD line sensor 7 from one end in the sub-scanning direction. The CPU 23 counts a specified number of pixels based on the pickup image signal from the CCD line sensor 7, and stores the count value in the memory 28 (step #3). The above-mentioned operation is repeated In a specified cycle until the pre-scan for all the lines will be completed. When the pre-scan is completed (YES at step #4), the count value is calculated (step #5), so that distributions of height data and outline dimension data in the lateral direction of the document can be obtained. Based on these data, the document size is calculated (step #6), and then, it is calculated how much degree the document position is put apart from the reference position in which the document 10 is to be placed (offset amount) by use of the height data and so forth (step #7). Detail of the principle and method of obtaining the data will be described hereinafter.

When the measurement of the shape and so forth of the document through the above-mentioned operation is completed, then the CPU 23 enters into a process of deciding whether or not the document 10 is correctly placed on the document table 1 (step #8). This process is executed by deciding whether or not the document 10 is put apart from the reference position of placement by not less than a specified offset amount, and deciding whether or not the document is inclinedly arranged relative to the reference position of placement. In case that the document 10 is not put apart from the reference position of placement by not less than the specified offset amount, the CPU 23 decides that the document 10 is correctly placed, and sets up conditions required for an optimum sheet/magnification setting process and a process of erasing an image of a portion irrelevant to the document based on the document size obtained through the aforementioned processing operation (step #9). In case that the document 10 is put apart from the reference position of placement by not less than the specified offset amount, the CPU 23 decides that the state of placement of the document 10 is abnormal, informs the operator of the abnormality by operating alarm means (step #10), and interrupts the image reading operation to return to the initial state. After it is decided that the document 10 is correctly placed and the aforementioned condition setting is completed, a main scan is executed to pickup the image of the document 10 by scanning the CCD line sensor 7 in a direction reverse to that of the pre-scan (step #11). After the main scan is completed, the lamp is lit off (step #12), and the image reading operation ends.

Figure 9:
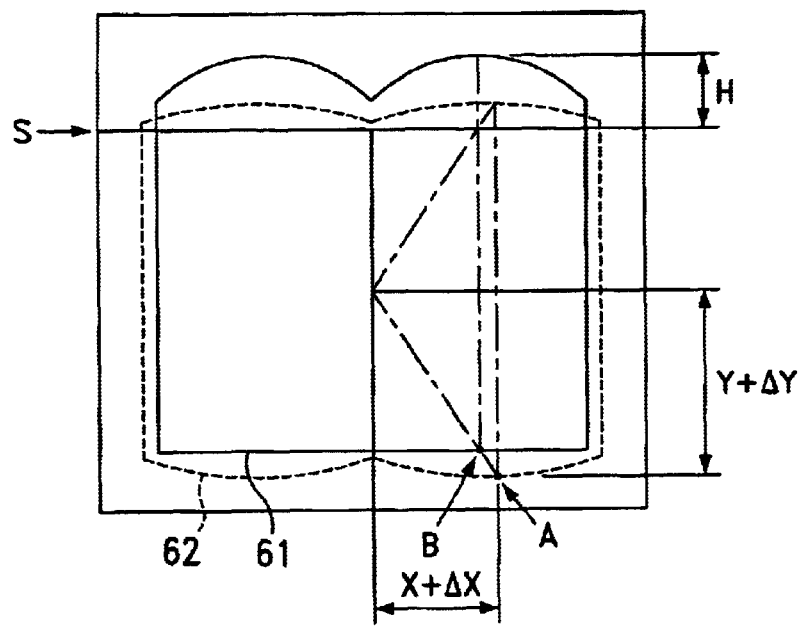
FIG. 9 is a plan view for explaining a document size calculating method of the present invention.
Figure 10:
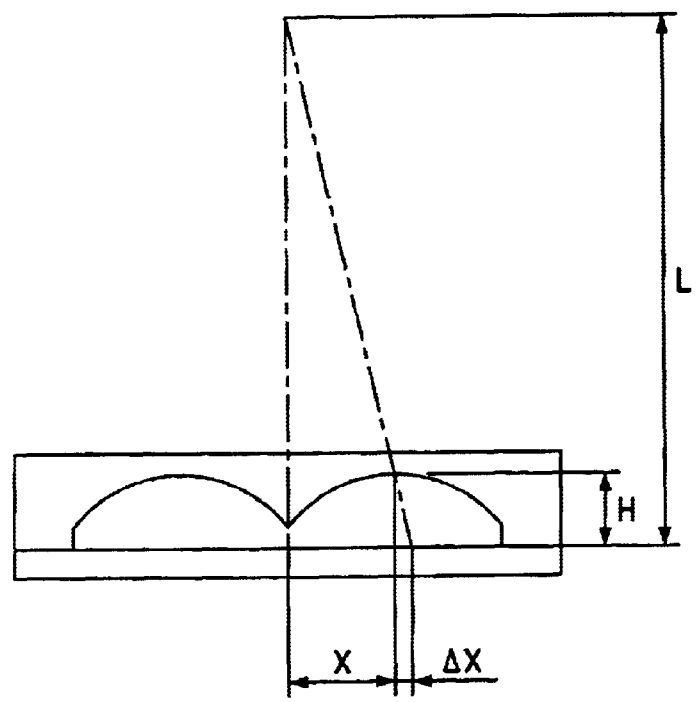
FIG. 10 is a front view for explaining the document size calculating method of the present invention.
Figure 11:
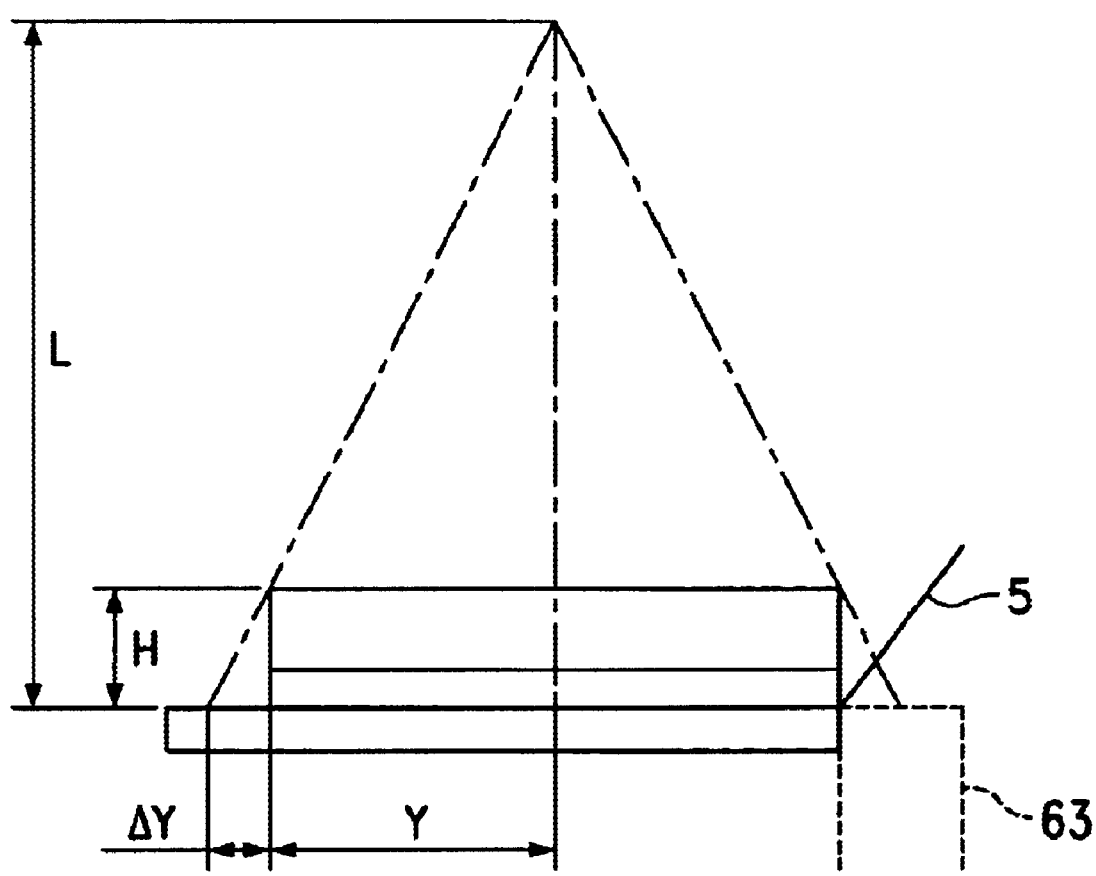
FIG. 11 is a side view for explaining the document size calculating method of the present invention.

Next, a document size calculating method will be described with reference to FIGS. 9 through 11. FIG. 9 shows a plane of a book document on the document table 1 and a side surface of the book document reflected on the distance measuring mirror 5. FIG. 10 shows a state of the image pickup operation viewed from in front. FIG. 11 shows a state of the image pickup operation viewed from a side surface. In FIG. 9, a solid line 61 indicates the actual outline of the document, a dotted line 62 indicates the outline of a document image picked up by the present apparatus. In FIG. 11, a dotted line 63 indicates a mirror image formed by the distance measuring mirror 5. FIGS. 9 through 11 show a case where the document is placed in a reference position of placement (the reference position in which the upper end portion of the document is to be positioned is represented by S). In regard to the pickup image of the document, the higher the height of the document is, the closer the document surface is located to the image pickup camera unit 2, resulting in forming a pickup image larger in outline than the actual document. In the case of a book document, center portions of each page are put high, while the bound portion and both end portions are put low. Consequently, there results an oval image in which the upper and lower ends of the contour expand outward. The expansion depends on distance between the image pickup lens 6 and the document and the outline dimensions of the document.

In FIG. 9, assuming that the lateral direction of the figure is the X-coordinate direction and the longitudinal direction of the figure is the Y-coordinate direction with respect to the center of the document set as an origin of the document, and the coordinates of a contour point B in a plane of the document are (X, Y), then the coordinates of a contour point A in a pickup document image can be expressed as (X+ΔX, Y+ΔY). The contour point B of the actual document has a height H. Therefore, assuming that an image pickup distance between the image pickup lens 6 and the document table 1 is L as shown in FIGS. 10 and 11, the following relational expressions hold. According to the expressions, the coordinates (X, Y) of the contour point B of the document can be obtained from the coordinates (X+ΔX, Y+ΔY) of the contour point A of the document image and the height H obtained through the image pickup operation.

from $$\frac{X + \Delta X}{L} = \frac{X}{L - H}, \quad \Delta X = \frac{H \times X}{L - H} \qquad (1)$$

from $$\frac{Y + \Delta Y}{L} = \frac{Y}{L - H}, \quad \Delta Y = \frac{H \times X}{L - H} \qquad (2)$$

Figure 12:
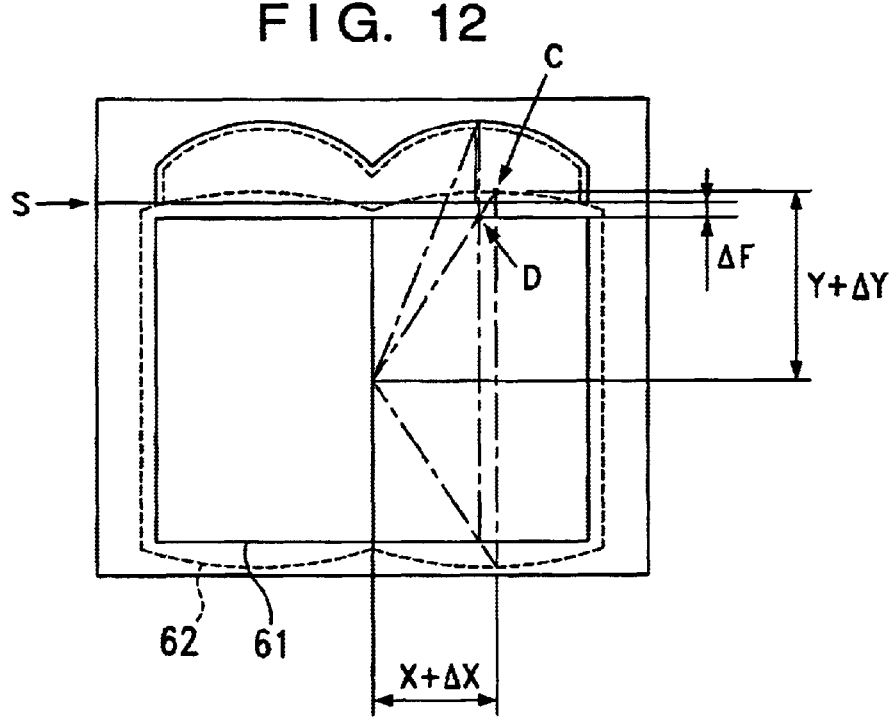
FIG. 12 is a plan view for explaining a document offset amount calculating method of the present invention.
Figure 13:
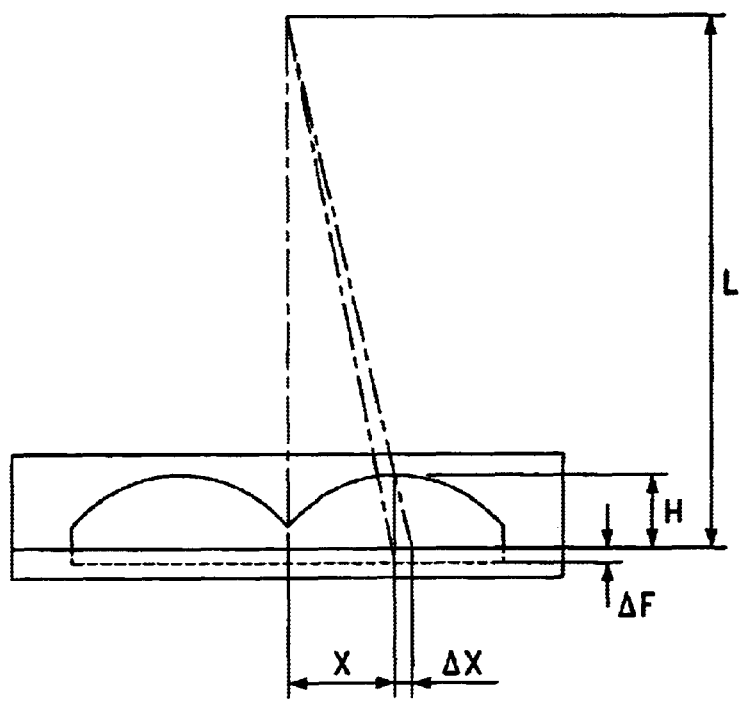
FIG. 13 is a front view for explaining the document offset amount calculating method of the present invention.
Figure 14:
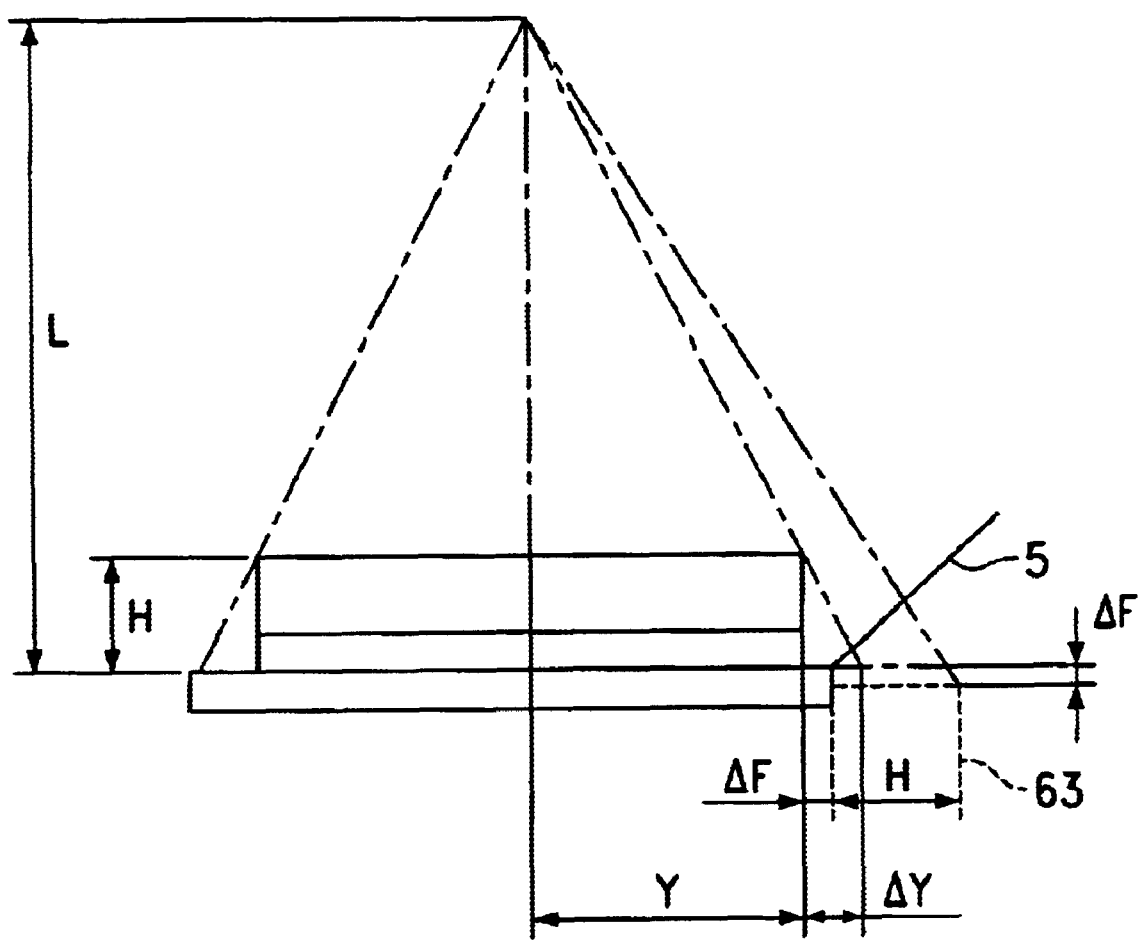
FIG. 14 is a side view for explaining the document offset amount calculating method of the present invention.

Next, a document offset amount calculating method will be described with reference to FIGS. 12 through 14. FIGS. 12 through 14 are views having a relation similar to that of FIGS. 9 through 11. In FIGS. 12 through 14, the document is placed as offset by ΔF from the reference position of placement (the reference position in which the upper end portion of the document is to be placed is represented by S). In the same manner as described above, the coordinates (X, Y) of a contour point D of the document can be obtained from the coordinates (X+ΔX, Y+ΔY) of a contour point C of the document image and the height H of the contour point D of the document. When the coordinates of the contour point D of the document are obtained, the value of the offset amount ΔF can be obtained by calculation. It is proper to decide whether or not the document is placed in the correct position based on the magnitude of the offset amount ΔF.

Practically, when there is an offset as shown in FIGS. 13 and 14, the position of the image of the document end side surface reflected on the distance measuring mirror 5 is shifted downward by ΔF. Therefore, the height of the contour point D of the document measured by the present apparatus is lower than the true height H. So, the measured height data is preferably corrected according to the offset amount ΔF obtained by the aforementioned calculation. The variation of the height is a value depending on the offset amount ΔF of the document and the height H of the document, the variation can be ignored when the image pickup distance L is sufficiently large to the document size (in this embodiment, Y has a correlation with the longitudinal dimension). Furthermore, when the document size (correlating Y) is sufficiently large to the height H of the document, the variation of the height H of the document can be approximated by the following equation. When an error attributed to the approximation is a problem, it is proper to measure the height of the document from a side surface by means different from the means for image pickup so that the height data of the document does not change even if the position of placement of the document changes.

$$\Delta H = \frac{Y}{L} \times \Delta Y \quad (3)$$

In the above-mentioned embodiment, the calculating process of the longitudinal (lengthwise) dimension of the document has been described. According to a similar way of thinking, a calculating process of the lateral (sidewise) dimension can be performed. Also, when the document surface is smaller in size than the outline in a case of a hard-cover book or the like, an offset is generated if the document is correctly placed in the reference position. In such a case, it is acceptable to shift the pickup image in the longitudinal direction and effect a correcting process for aligning the end of the document with a specified position. As an image pickup device, a two-dimensional area CCD sensor and the like may be used instead of the aforementioned one. The detection of height of the document may be performed by illuminating a line beam at an inclined angle to the document, detecting a reflection light from the document, and picking up the curvature of the reflection light.

Figure 15:
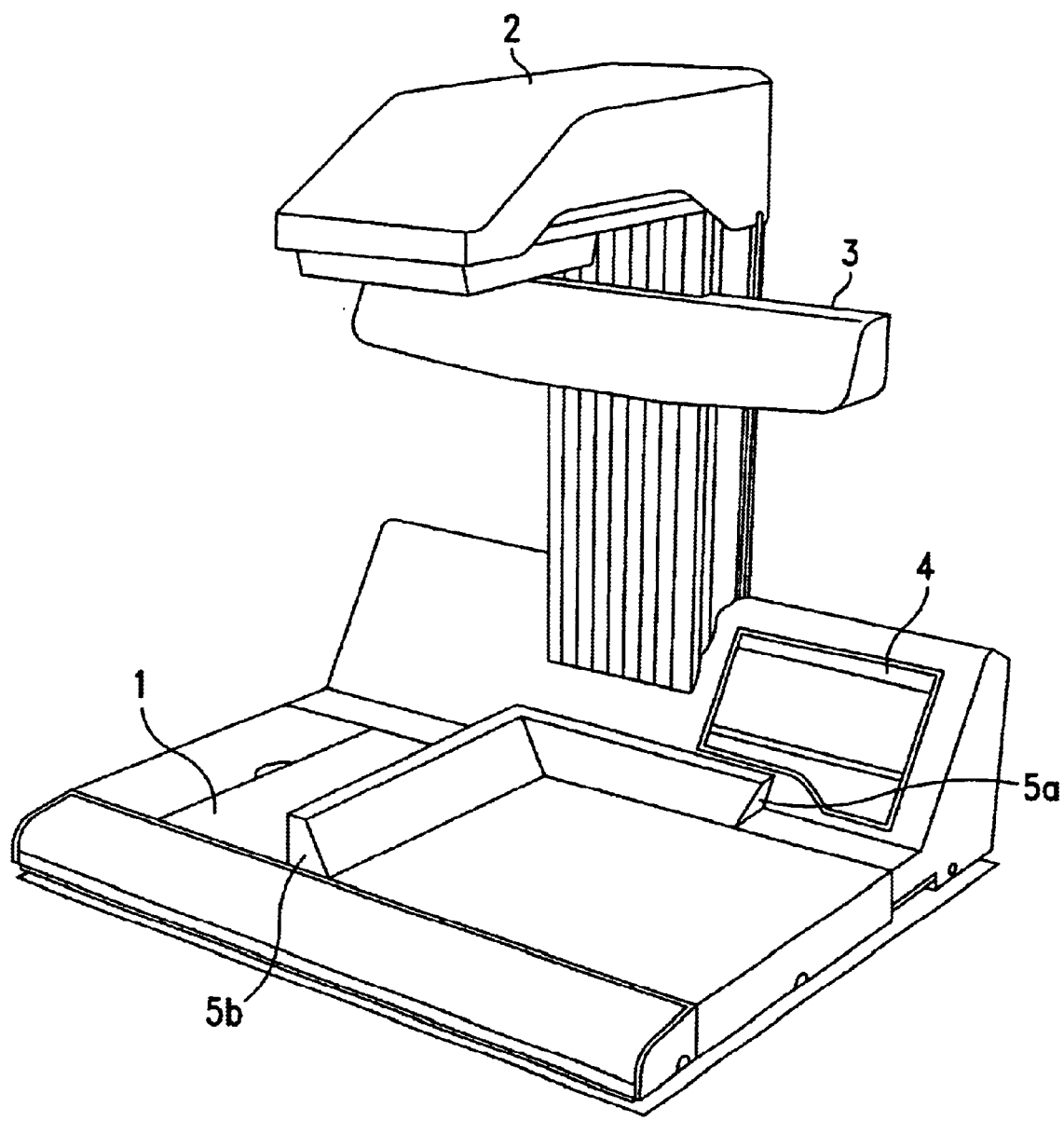
FIG. 15 is a perspective view of an image reading apparatus of an another embodiment of the present invention.

Furthermore, as shown in FIG. 15, there may be a construction in which two distance measuring mirrors (an upper surface mirror 5a and a side surface mirror 5b) for measuring the height of an object are provided perpendicularly to each other, so that images of three surfaces of a front surface, a side surface and a top surface of the object can be picked up. In this construction, by correcting data obtained by image pickup of the front surface by the height data obtained from data obtained by image pickup of the side surface and the top surface, the solid configuration of the object can be correctly picked up without moving the object. Further, it is acceptable to provide a light source at the document table to detect the position of a document and take advantage of the fact that a difference in luminous intensity is generated depending on whether or not a document exists.

Next, a second embodiment of the present invention will be described. It is to be noted that the same components as those of the first embodiment are denoted by the same reference numerals in the second embodiment, and no explanation is provided therefor. FIG. 16 shows an image reading apparatus integrated with a movable document table according to the second embodiment. The present apparatus has the same basic image reading operation as that of the apparatus of the first embodiment shown in FIG. 1. However, the present apparatus differs from the apparatus of the first embodiment in that a movable document table 31 is provided as a document table, and that a distortion of a read image attributed to a curved configuration of a document such as a thick book and so forth is detected, whether or not the distortion is correctable is decided, the distortion is corrected when the distortion is correctable, and a process of interrupting the reading operation or the like is executed when the distortion exceeds a limit of correction. An operation and display panel 32 for giving a variety of operation commands and displaying indications is provided rearwardly of the document table 31. At right and left portions of the document table 31 are provided a reading switch 33 for starting a reading operation and an error cancel switch 34 for canceling an error alarm issued when the distortion exceeds a distortion correcting limit.

Figure 17:
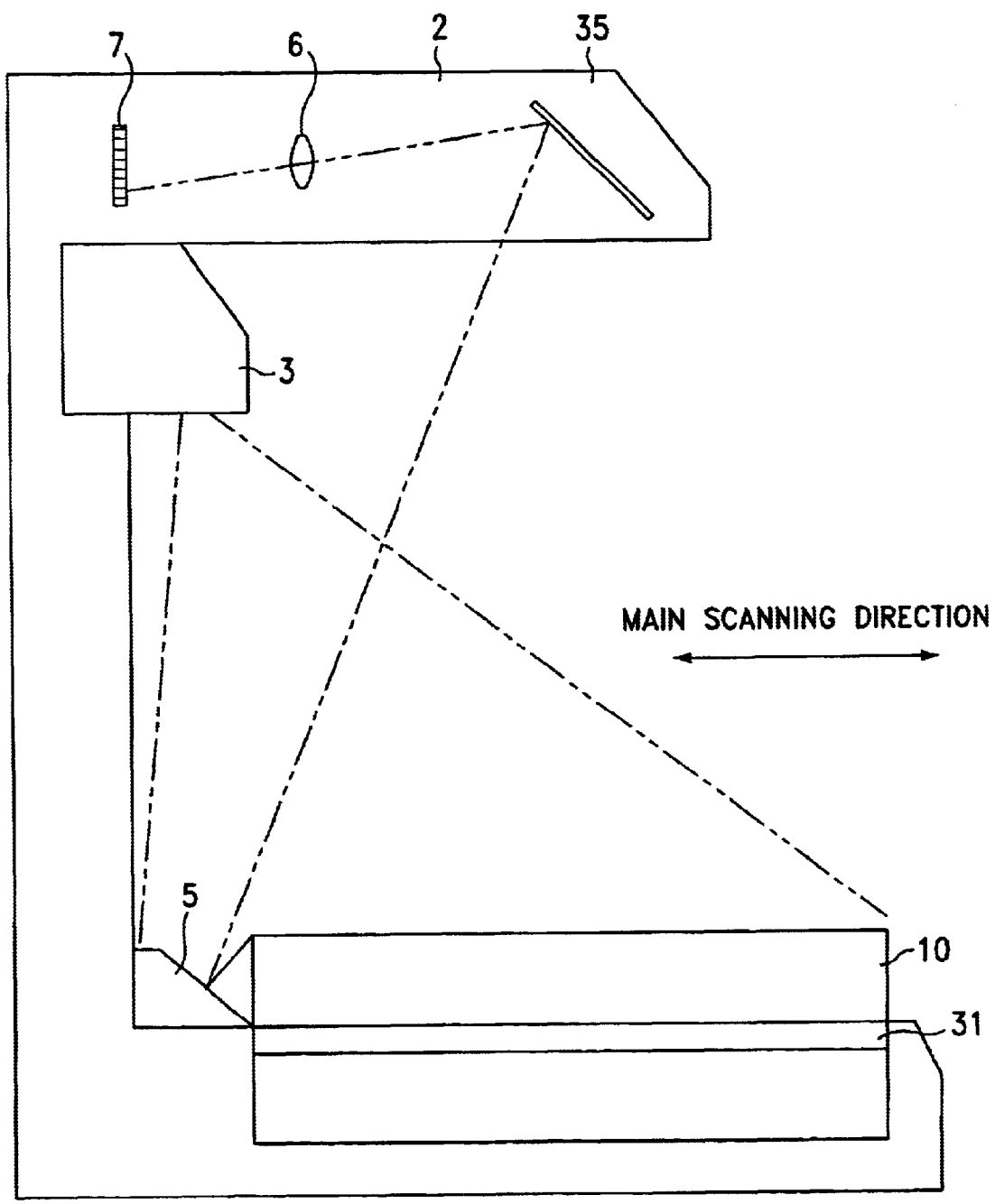
FIG. 17 is a side view showing a construction of a distance measuring unit of the present invention.

The construction of a distance measuring unit of the image reading apparatus of the second embodiment is shown in FIG. 17. An image of a book document 10 is reflected on a reflection mirror 35 of an image pickup camera unit 2, and then focused on a CCD line sensor 7 that is an image pickup device through an image pickup lens 6. The sensor 7 is driven in the sub-scanning direction.

Figure 18:
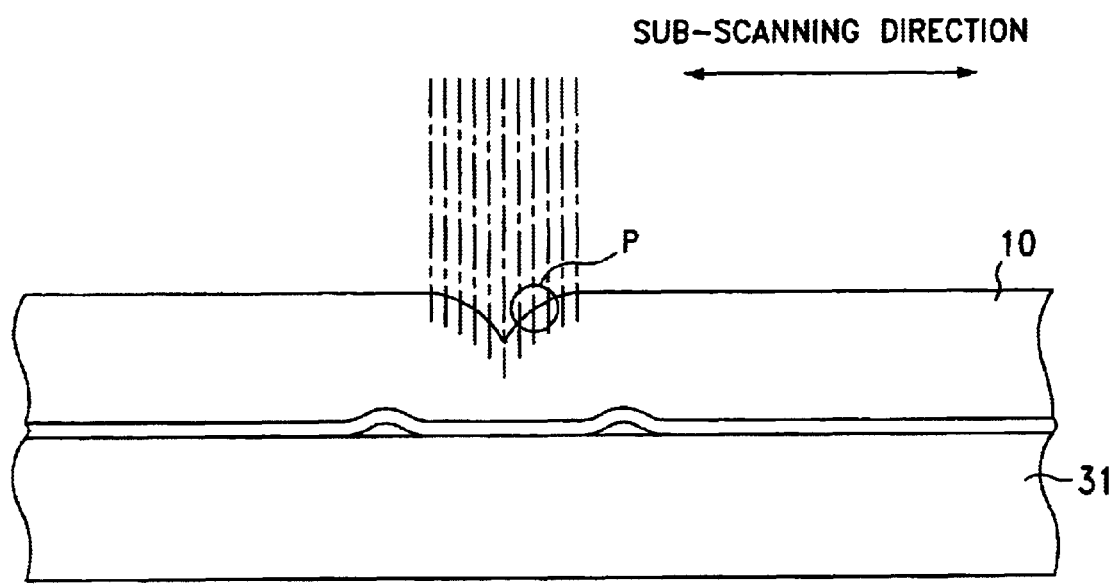
FIG. 18 is a view showing a method for obtaining a document deflection angle.
Figure 19:
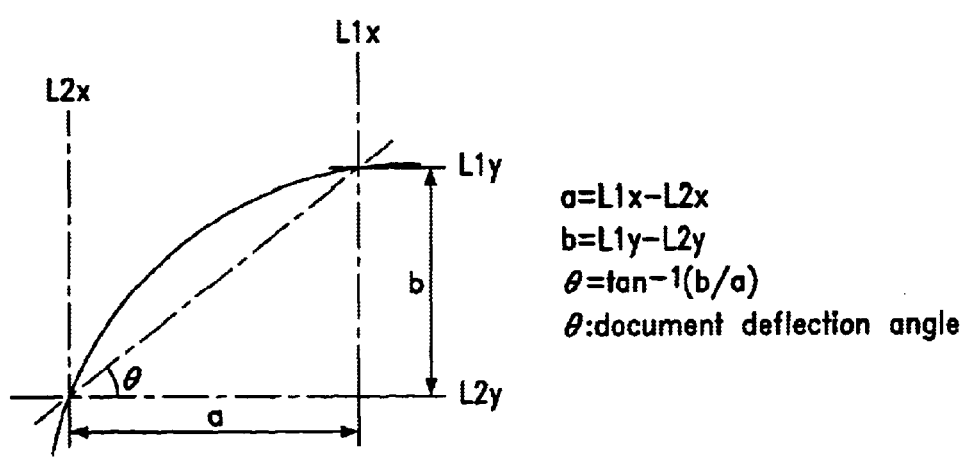
FIG. 19 is an enlarged view of a portion P shown in FIG. 18.

Next, detection of image distortion (curvature of line, character compression and so forth) executed in the image reading apparatus of the second embodiment and a countermeasure thereto will be described with reference to FIGS. 18 and 19. FIG. 18 shows a configuration in height of a book document 10 and each line (one-dot chain line), of which distance is measured, in the sub-scanning direction on the document table 31 as viewed from the front side, while FIG. 19 shows an enlarged view of a portion P shown in FIG. 18. In a pre-scan operation, by reading the upper end side surface image of the document reflected on the distance measuring mirror 5, height data of the document in each line in the sub-scanning direction are collected. From a distance "a" and a height difference "b" between adjacent lines, a document deflection angle θ can be calculated every line. That is, in FIG. 19, equations:

$$a = L1x - L2x, \ b = L1y - L2y, \text{ and } \theta = \tan^{-1}(b/a) \text{ hold}.$$

By effecting expansion and other processing operations on the read image data of each line using the thus obtained document deflection angle θ, the image distortion can be corrected.

When the deflection angle θ calculated as above is within a range to a certain limit, the image distortion due to the deflection of the document can be corrected. However, correction of the image distortion becomes difficult when it exceeds the limit. For instance, when the document deflection angle θ is within a range of 0° to 60°, the correction can be achieved. When the document deflection angle θ exceeds 60°, the correction cannot be achieved. In the latter case, when the image obtained by the main scan is outputted, a distorted character or the like results. In the present embodiment, when it is found that the image distortion exceeds the limit of correction in the stage of the pre-scan, an error alarm is issued to the operator to urge the operator to rearrange the document before the main scan. It is to be noted that such alarm means can be applied to an image reading apparatus where the document is read with face down.

Figure 20:
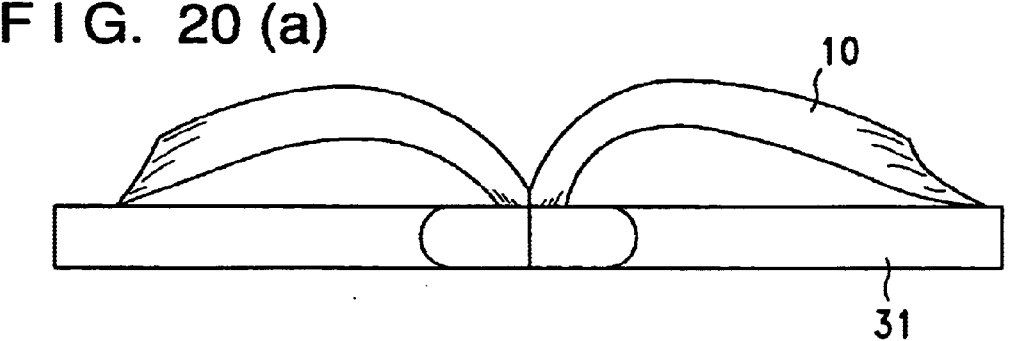
FIG. 20(a) is a view showing a state of the document in the present invention.
FIG. 20(b) is a view showing a state of the document in the present invention.
Figure 20:
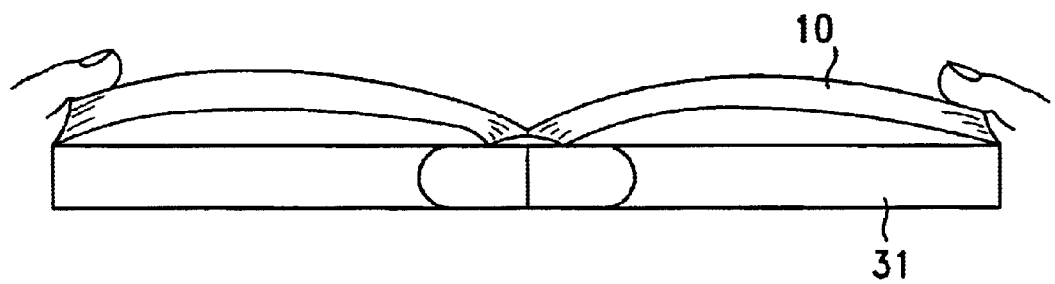

A countermeasure in the case where such an alarm is issued as the result that the image distortion exceeds the limit as described above will be described. FIGS. 20(a) and 20(b) show an example of canceling the alarm. When the pre-scan is executed with the book document 10 opened naturally as shown in FIG. 20(a), an error alarm is issued to the center portion of the book document in almost all the cases of book documents. When the image reading is executed in such a state, a distorted character or the like will be outputted. Therefore, an alarm is issued to the operator for the purpose of urging the operator to depress the book document 10 with his fingers in a manner as shown in FIG.

Figure 21:
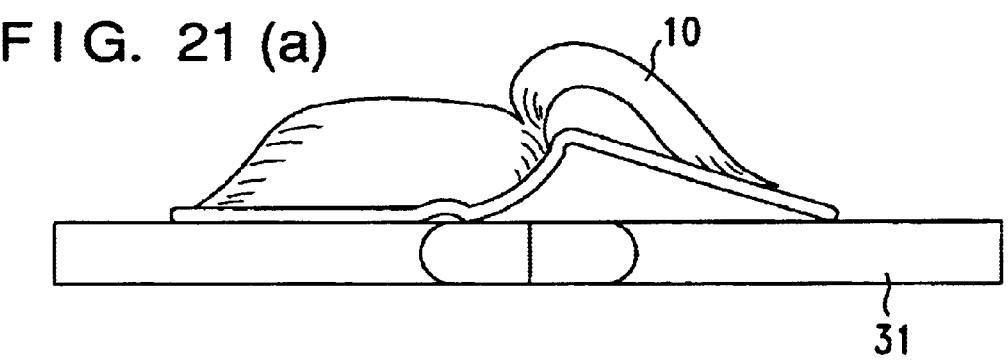
FIG. 21(a) is a view showing a state of the document placed on a movable document table in the present invention.
FIG. 21(b) is a view showing a state of the document placed on the movable document table in the present invention.
Figure 21:
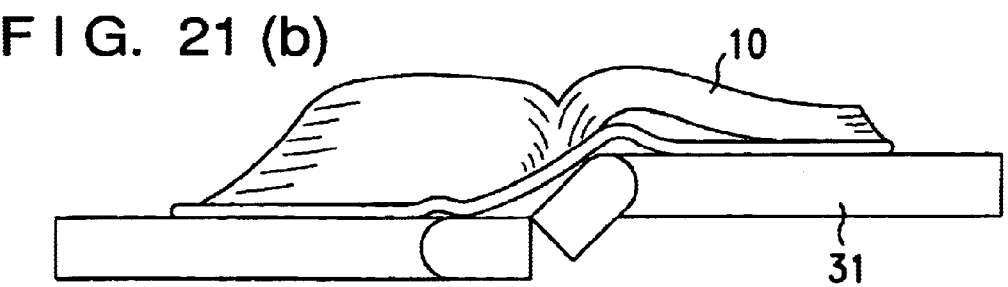

20(*b*). By the above-mentioned operation, the error is canceled. FIGS. 21(*a*) and 21(*b*) show an exemplified method of canceling the alarm by use of the movable document table 31. When the movable document table 31 is horizontal and the book document 10 is a thick book document as shown in FIG. 21(*a*), the angle of curvature at the center portion thereof cannot always be corrected depending on the pages opened. Therefore, in a manner as shown in FIG. 21(*b*), by vertically moving one side of the movable document table 31, the error canceling can be easily effected.

Figure 22:
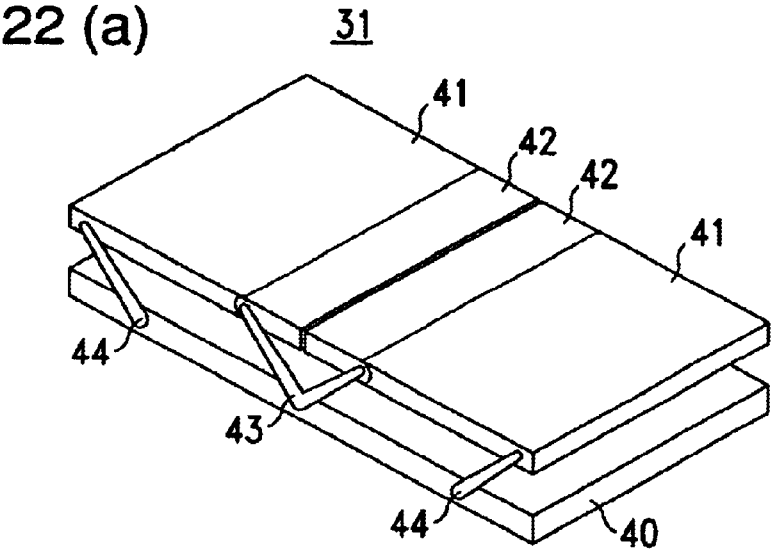
FIG. 22(a) is a perspective view of the movable document table.
FIG. 22(b) is a perspective view of the movable document table.
FIG. 22(c) is a perspective view of the movable document table.
Figure 22:
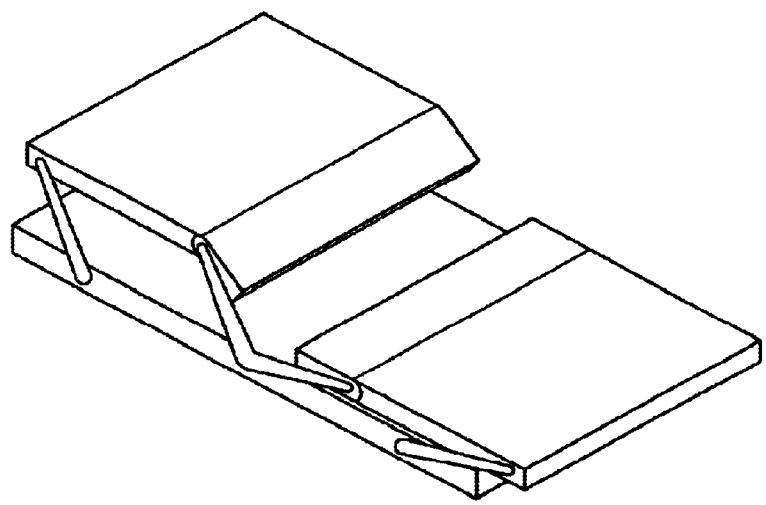
Figure 22:
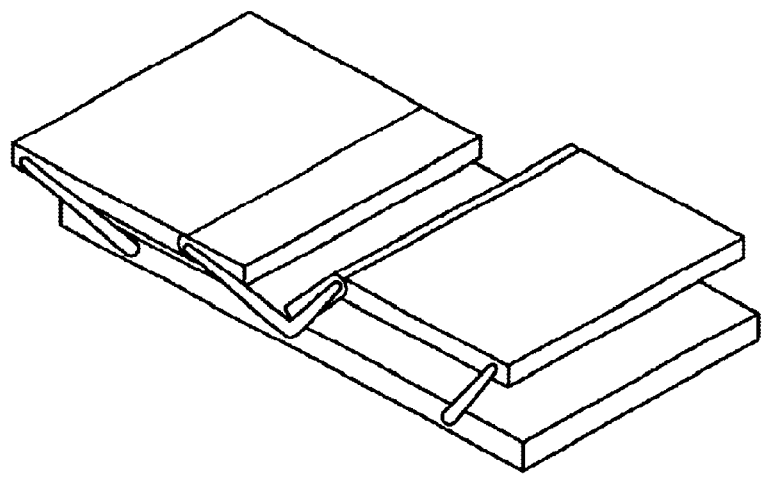
Figure 23:
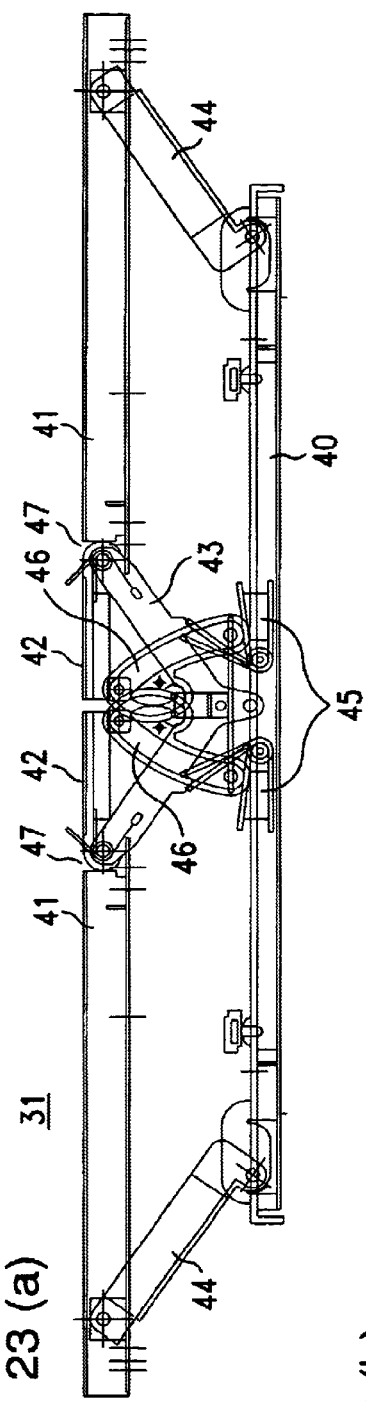
FIG. 23(a) is a front view of the movable document table of the present invention.
FIG. 23(b) is a front view of the movable document table of the present invention.
FIG. 23(c) is a front view of the movable document table of the present invention.
Figure 23:
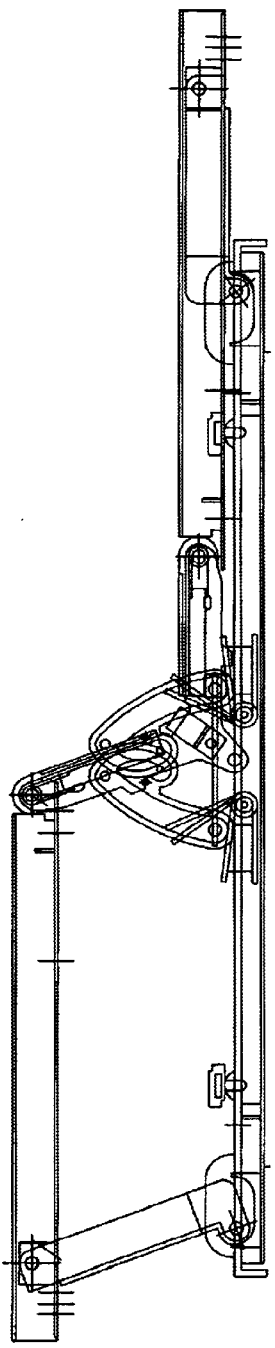
Figure 23:
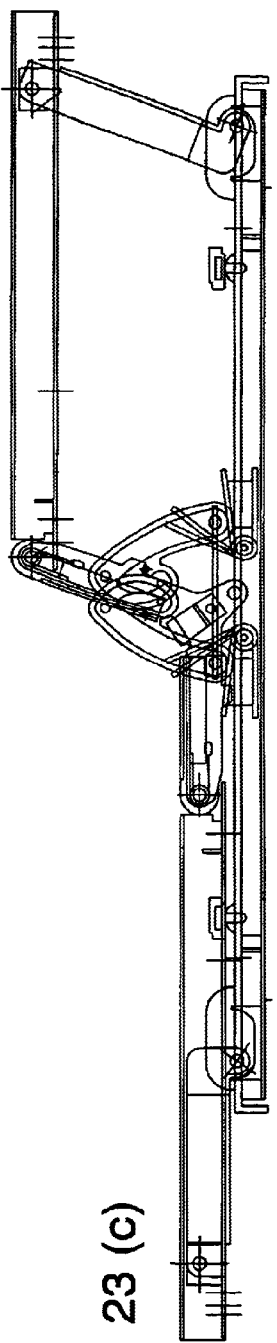

FIGS. 22(*a*), 22(*b*), 22(*c*), 23(*a*), 23(*b*) and 23(*c*) show an embodiment of the movable document table 31. FIGS. 22(*a*), 22(*b*) and 22(*c*) show perspective views of the movable document table and FIGS. 23(*a*), 23(*b*) and 23(*c*) show front views thereof. In the movable document table 31, its document receiving surface is divided into four sections. Document receiving surfaces 41 arranged at right and left side portions above a document table base 40 are kept horizontal even if they are moved vertically, while document receiving surfaces 42 arranged at the center are put in horizontal postures in their standard positions. However, when the document receiving surfaces 41 at both sides are moved vertically, the document receiving surfaces 42 are inclined appropriately to be put in postures corresponding to the spine of the book document. The document receiving surfaces 41 at both sides are so constructed that their portions near the center (including the document receiving surfaces 42 at the center) are connected with each other via a V-shaped connection member 43, and their portions near the side ends are connected with connection members 44 that are parallel to respective sides of the V-shaped connection member 43. The document receiving surfaces 41 and the connection members 43 and 44 form respective parallelograms. The connection members 43 and 44 have their one ends connected to the document receiving surfaces 41, and have their other ends connected to the document table base 40, where the connection members can pivot. FIGS. 22(*a*) and 23(*a*), show a state in which the document receiving surfaces are in their standard positions, FIGS. 22(*b*) and 22(*b*) show a state in which the left document receiving surface is raised and the right document receiving surface is lowered, and FIGS. 22(*c*) and 23(*c*) show a state in which the right document receiving surface is raised and the left document receiving surface is lowered.

Further, an elastic member is provided between the document receiving surfaces 41 and 42 and the document table base 40 so that the document receiving surfaces 41 return to their standard positions when the document table is not in use. In the present example, a torsion coil spring 45 is provided in the vicinity of a pivot axis of the V-shaped connection member 43 on the document table base 40 side. Instead of the torsion coil spring, an elastic material such as a compression coil spring, sponge, rubber and so on may be used. The document receiving surfaces 42 provided at the center are pivotally connected to the respective document receiving surfaces 41 provided at both sides, and are regulated so that they do not move above the document receiving surfaces 41. When one of the document receiving surfaces 41 is located above the standard position, the center document receiving surface 42 connected to this is lowered according to the shape or the weight of the document placed on the document receiving surface 42. In the present example, cams 46 are used so that the center document receiving surfaces 42 incline according to the positions of the document receiving surfaces 41 at both sides. Further, a torsion coil spring 47 is used so as to put the center document receiving surfaces 42 back to their standard positions. According to the movable document table 31 of the present embodiment, there is produced an effect of easily adjusting the objective document surface within the correctable range in the case of a thick document. In the present example, the document receiving surfaces are moved up and down according to the thickness of a document when the operator places the document on the surfaces. However, the vertical movement and an accompanying movement of the center members can be automated.

Figure 24:
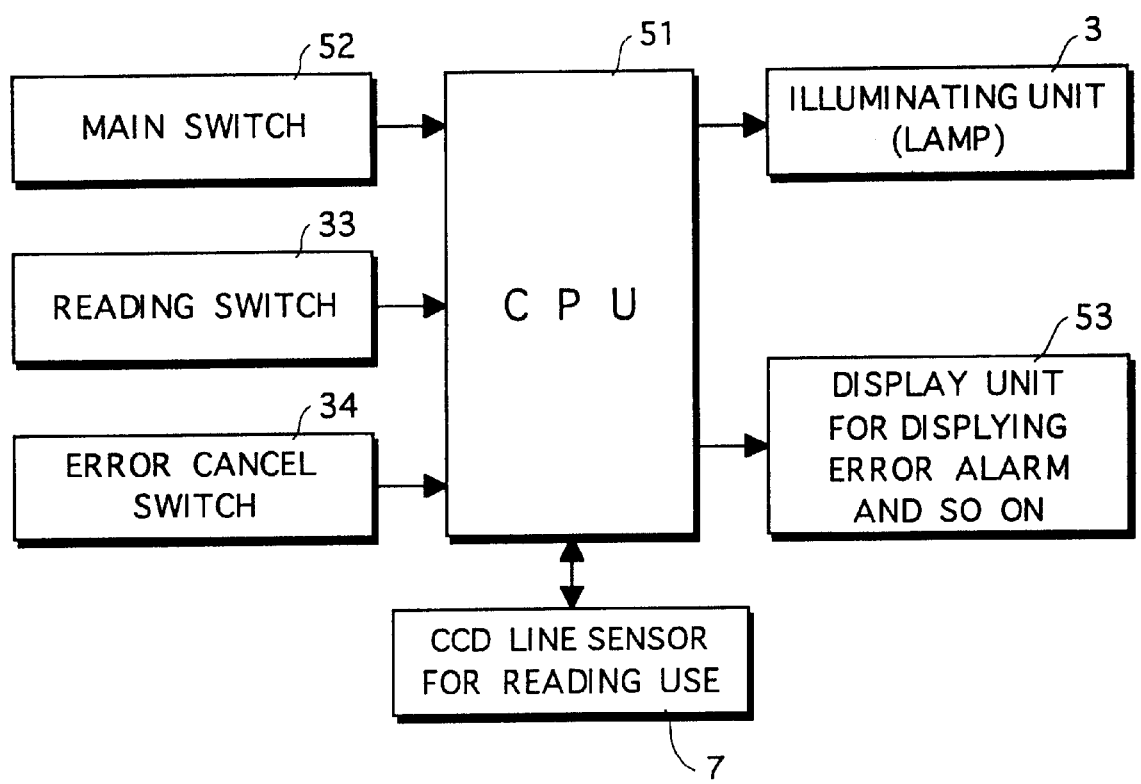
FIG. 24 is a block diagram of a controlling unit of the present invention.

FIG. 24 shows a block diagram of a controlling unit in the image reading apparatus of the present embodiment. A CPU 51 receives signals from a variety of operation switches of an operation and display panel 32, a main switch 52, a reading switch 33, an error cancel switch 34 and so forth, and controls lighting of a lamp of an illuminating unit 3 and reading operations through the pre-scan and main scan by the CCD line sensor 7 for reading use. The CPU 51 further controls a display unit 53 for displaying indications of the state of reading, whether or not the reading operation is enabled, error alarm and so forth. The display unit 53 is constituted by light emitting elements of a plurality of colors provided, for example, in the reading switch 33, the error cancel switch 34 or the like. With a change of color by the lighting of the light emitting elements, there are displayed indications of the fact that the reading operation is enabled, the fact that the reading is now executed, the fact that an error is occurring, and so forth. It is also acceptable to change the colors of display contents provided at the operation and display panel 32. Otherwise, an alarm sound may be issued according to the change of indication colors. Further, the CPU 51 is provided with means for executing the calculation for obtaining the document deflection angle $\theta$ in detecting the image distortion as explained with reference to FIGS. 18 and 19, and deciding whether or not the degree of the distortion is within the correctable range.

Figure 25:
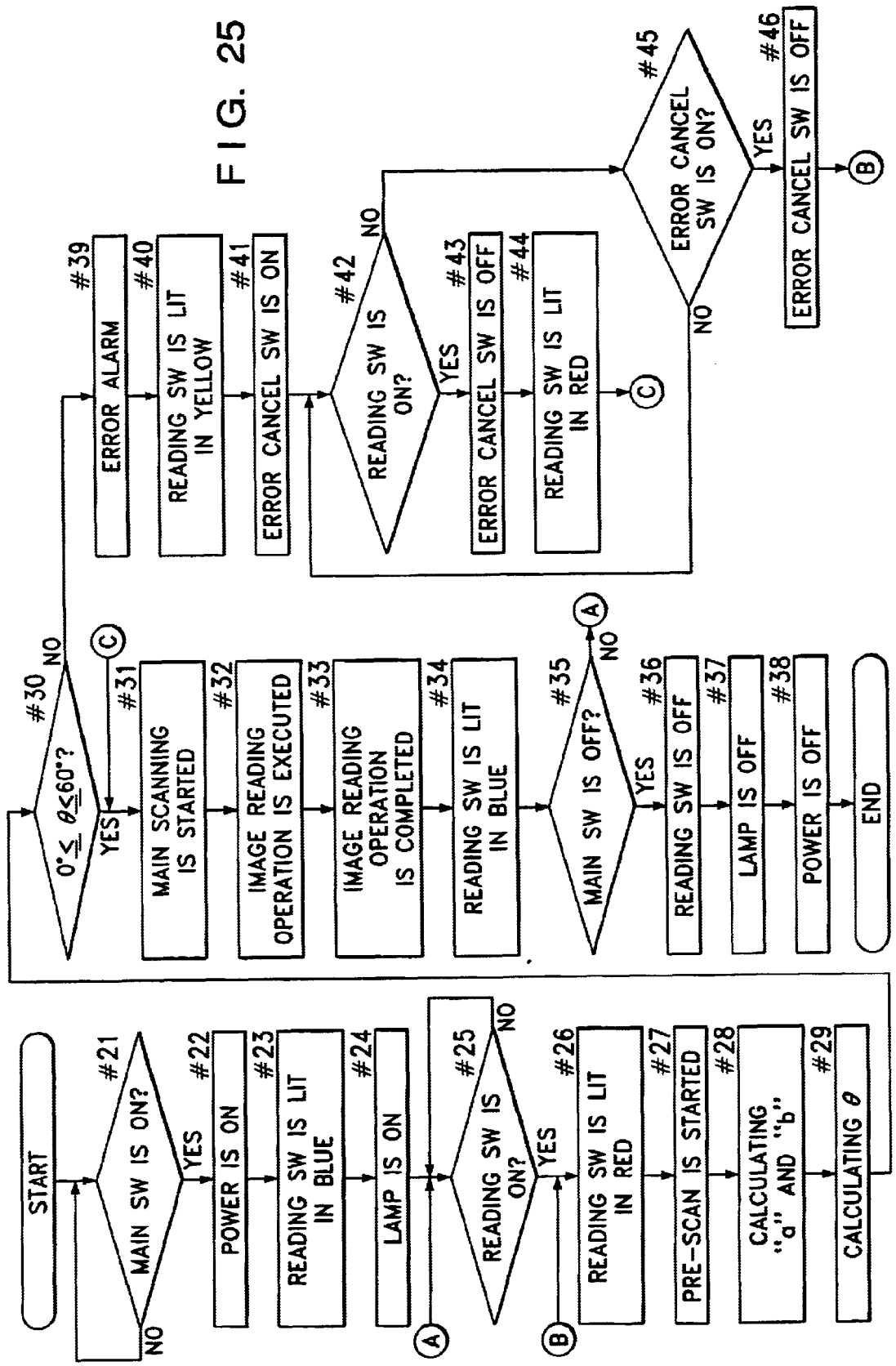
FIG. 25 is a flowchart of a reading operation of the present invention.

Next, the reading operation in the image reading apparatus of the present embodiment will be described with reference to a flowchart of FIG. 25. When the main switch 52 is turned on (YES at step #21), the power is turned on (step #22) to enable the reading operation. The CPU 51 displays the indication of reading operation enabled at the display unit 53. The indication of reading operation enabled is effected by making the light emitting element provided in the reading switch 33 light in blue (step #23). Subsequently, the lamp in the illuminating unit 3 is turned on (step #24), and the program flow waits for the turning-on of the reading switch 33 (step #25). When the reading switch 33 is turned on, the light emitting element provided in the reading switch 33 is lit in red to indicate that the reading operation is now executed (step #26). Then, the pre-scan is started (step #27) to drive the CCD line sensor 7 in the sub-scanning direction. The CPU 51 obtains height data (the aforementioned distance "a" between lines and the height difference "b" shown in FIG. 19) of the document by calculation from an output of the CCD line sensor 7 (step #28), and obtains the document deflection angle $\theta$ of each line in the sub-scanning direction by calculation based on the calculated data of "a" and "b" (step #29).

The CPU 51 Judges whether or not the document deflection angle $\theta$ is within the correctable range (step #30).

When the document deflection angle $\theta$ is within the range of 0° to 60° it is judged that the correction can be effected. When the angle $\theta$ obtained by the calculation exceeds 60° in at least one portion, it is judged that the correction cannot be effected. Also, in the second embodiment, although it is judged that the correction cannot be effected when the angle $\theta$ exceeds 60° in at least one portion, it is acceptable to judge that the correction cannot be effected when the angle θ exceeds 60° in portions greater in number than a specified value. When it is judged that the correction can be effected (YES at step #30), the main scan is started based on pre-scan data (step #31), and then the image reading operation is executed (step #32). When the image reading operation is completed (step #33), the light emitting element provided in the reading switch 33 is lit in blue so as to indicate that the reading operation is enabled again (step #34), and it is checked whether or not the main switch 52 is turned off (step #35). When the main switch 52 is not turned off, the program flow returns to step #25 to repeat the above-mentioned operation. When the main switch 52 is turned off, the light emitting element provided in the reading switch 33 is turned off (step #36), the lamp in the illuminating unit 3 is turned off (step #37), and the power is turned off (step #38).

When it is judged that the distortion correction cannot be effected at step #30 (NO at step #30), an error alarm is issued so as to inform the operator of the fact that the correction cannot be effected (step #39). As a means for the alarm, the light emitting element provided in the reading switch 33 is lit in yellow (step #40). As a means for the alarm, an alarm sound or the like may be issued. Subsequently, the light emitting element in the error cancel switch 34 is lit (step #41) thereby calling for the operator's attention. It is to be noted that the reading switch 33 can be turned on even if the light emitting element provided therein is lit in yellow (the switch is used particularly when the canceling of the error is not required). The operator who notices that the state of placement of the document is not good by the error alarm issued at step #39 can rearrange the placement of the document. Then, it is checked whether or not the reading switch 33 is turned on (step #42). When the reading switch 33 is turned on, the light emitting element provided in the error cancel switch 34 is lit off (step #43), the light emitting element provided in the reading switch 33 is lit in red (step #44), and the program flow proceeds to step #31 to start the main scan. Since the necessary alarm is issued through the process of judging whether or not the correction as described above can be effected, the possible failure in reading and copying operations can be prevented. It is to be noted that the rearrangement of the placement of the document includes the use of the movable document table 31, and this is effective particularly in the case of a thick book document.

When the reading switch 33 is not turned on at step #42, it is checked whether or not the error cancel switch 34 is turned on (step #45). When the error cancel switch 34 is not turned on, the program flow returns to step #42 to wait in the loop. When the switch 34 is turned on, the light emitting element provided in the error cancel switch 34 is turned off (step #46), and the program flow returns to step #26 to restart from the pre-scan operation. The answer of step #45 becomes YES when the operator presses the error cancel switch 34 after putting the document into the correctable state by holding the document 10 or performing a similar operation. In the above-mentioned processing operation, the reading operation is not inhibited even if the error alarm is issued for the reason that correction cannot be effected, and the program flow can be compulsorily made to enter into the reading operation. The above-mentioned arrangement allows the user to select a reading operation that requires no perfect correction and includes a distortion, so that the apparatus can deal with a variety of the user's purposes. There may be a scheme of inhibiting the program flow from entering into the reading operation unless the error is canceled when the error alarm is issued.

In regard to the arrangement of the aforementioned reading switch 33 and error cancel switch 34 shown in FIG. 16, the arrangement should be made so that the switches can be operated when the operator is depressing the book document (having a size smaller than A3 size) by both his hands, the switches can be operated together with the movable document table 31, and the switches are excellent in operability. In the present embodiment, the reading switches and the error cancel switches at the right and left sides are arranged aslant. spreading out toward the operator so that the best operability can be assured in response to the variation in the document size, thereby allowing the operator to operate the switches while depressing the document ranging in size from the maximum document size of A3 to the minimum document size (unlimited).

In the present invention, the method of recognizing the document deflection angle is not limited to the aforementioned method. That is, instead of providing the distance measuring mirror 5, it is acceptable to arrange a plurality of optical sensors and calculate the angle from a detection output therefrom. Such a recognition method can be applied to an analog copying machine. Furthermore, whether or not the correction can be effected is judged according to the document deflection (inclination) angle, however, the present invention is not limited to this. It is acceptable to judge whether or not the correction can be effected from the shape of the document. For instance, it can be judged whether or not the correction can be effected according to an expansion dimension difference obtained from outline data having the expansion of the upper end portion of the document in the case where, for example, a book document image is picked up from above. Furthermore, the present invention can be applied to an error alarm in the case where the correction cannot be effected in excess of the distortion correction limit even in an image reading apparatus in which a document is read with face down.

Next, a pickup image distortion correcting method, in particular, centering of an image of facing pages will be described with reference to FIGS. 26 through 30. In the case where a document consists of facing pages of which left page is curved and the right page is approximately flat as shown in FIG. 26 is scanned, it is required to correct the distortion of the image and center the image. When such a document is scanned, an image as shown in FIG. 27 is obtained. In the present case, both ends of the image in the sub-scanning direction are detected in positions A and B in FIG. 27. When the center of the image in the sub-scanning direction is obtained based on the detection result, the center is located in a position C. When the pickup image shown in FIG. 27 is subjected to curvature correction and contraction (extension) correction processes, an image as shown in FIG. 28 is formed. In FIG. 28, both ends of the image in the sub-scanning direction are located in positions D and E. Therefore, the center of the image is located in a position F. When the image is centered according to the position C shown in FIG. 27 and the position F shown in FIG. 28, images as shown in FIGS. 29 and 30 are formed, respectively.

FIG. 29 shows the resulting image centered according to the image center position C obtained without taking the contraction correction into account. Therefore, when the image is printed out, the resulting image 56 deviates to the left with respect to a sheet 55, it is unfavorable. In contrast to the above, FIG. 30 shows the resulting image centered according to the center position F obtained by taking the contraction correction into account. Therefore, when the image is printed out, the resulting image 56 is correctly centered with respect to the sheet 55. As apparent from this example, in centering a document of facing pages of which one page has a distortion, it is proper to obtain the center of the image by taking the contraction correction into account with respect to the detected both ends in the sub-scanning direction and then center the image based on the obtained center of the image. In the present invention, the image distortion correction can be implemented by a variety of methods such as a line curve correction method and a character compression method.

Figure 31:
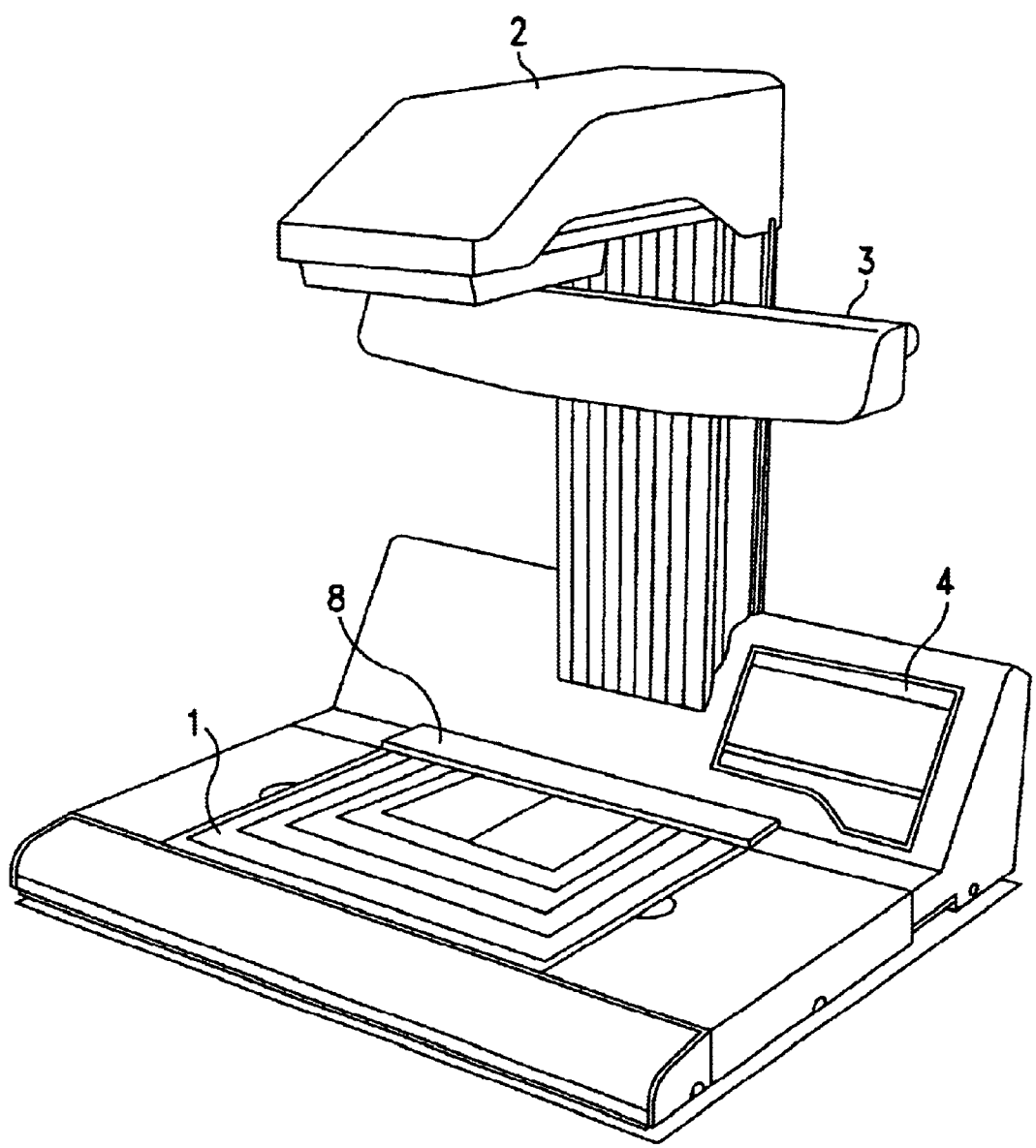
FIG. 31 is a perspective view of an image reading apparatus of the third embodiment of the present Invention.

Next, a third embodiment of the present invention will be described. It is to be noted that the same components as those of the first embodiment are denoted by the same reference numerals in the third embodiment, and no explanation is provided therefor. FIG. 31 is a perspective view of an image reading apparatus of the third embodiment. The image reading apparatus of the third embodiment differs from the apparatus of the aforementioned first embodiment in that a distance measuring plate 8 that is arranged rearward on the document table 1 and serves as a stopper for determining the document position is provided instead of the distance measuring mirror 5. The present apparatus includes an image pickup camera unit 2 having an image pickup device, an illuminating unit 3 for illuminating the document, an operating unit 4, and so forth in the same manner as described above. The document table 1 and the distance measuring plate 8 are colored in a density greater than that of a normal document. The image pickup device of the image pickup camera unit 2 simultaneously reads the surface of a document placed face up on the document table 1, the distance measuring plate 8, and the document table 1 in an optical scanning manner. In the third embodiment, the upper edge of the document surface is detected from read data, height data of the document is obtained from the above-mentioned data, and a variation in height generated due to the offset of the document from the reference position is corrected.

Figure 32:
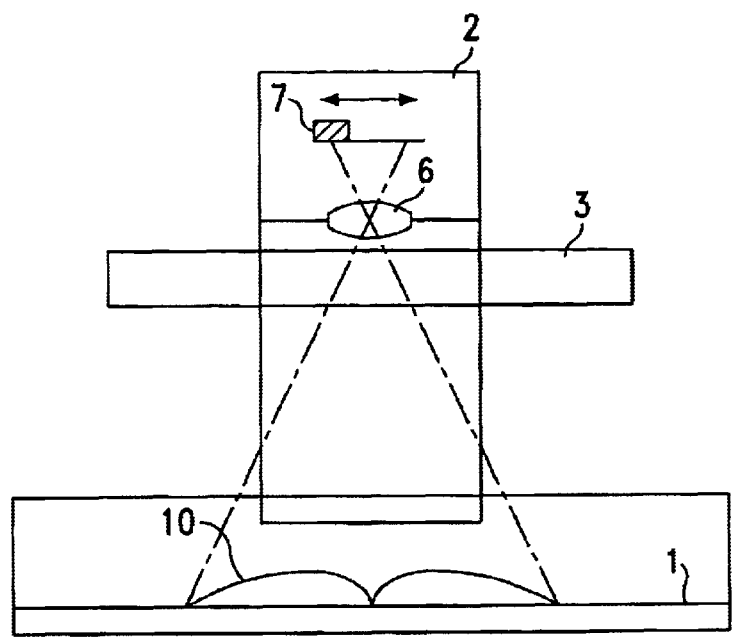
FIG. 32 is a schematic front view of the apparatus of the present invention.
Figure 33:
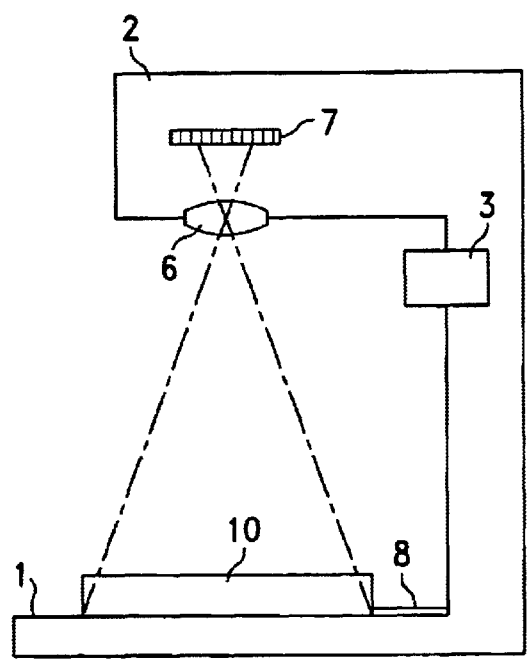
FIG. 33 is a schematic side view of the apparatus of the present invention.

FIGS. 32 and 33 show respectively a schematic front view and a schematic side view of the present apparatus. The image pickup camera unit 2 is constituted by an optical system having an image pickup lens 6 that is driven by a lens drive unit (not shown) and operates to focus the document image and an image pickup device comprised of the CCD line sensor 7 that moves in the sub-scanning direction (direction indicated by an arrow in FIG. 32) in a focal plane on which the document image is focused. An upper end of the document 10 is made to abut against the edge of the distance measuring plate 8 so as to adjust the document position.

Figure 34:
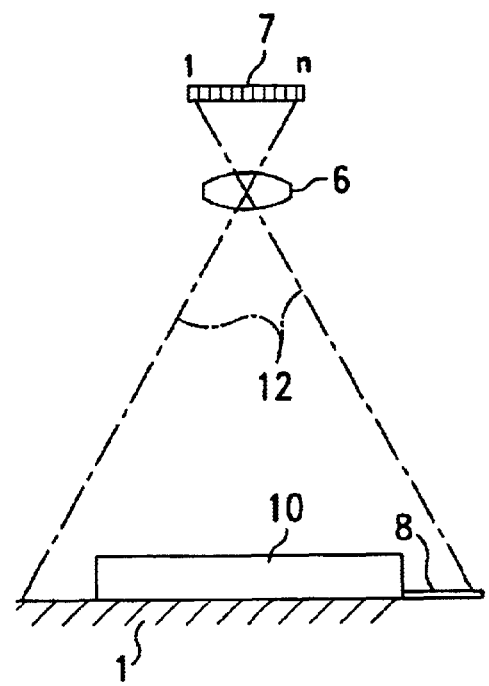
FIG. 34 is a view showing a principle of distance measuring in the present invention.

FIG. 34 is a view showing a distance measuring principle. The size of the read image of the document surface varies depending on the height of the document, and therefore a distribution in height of the document can be obtained from the document surface image. It is to be noted that a range of reading covered by the image pickup device is indicated by one-dot chain lines 12, and the image on the CCD line sensor 7 is expressed by 1 through n.

Figure 35:
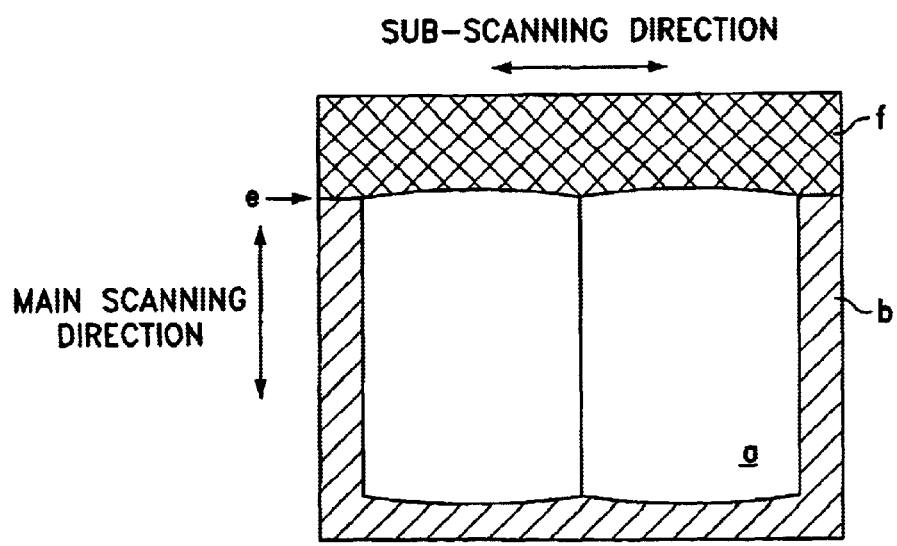
FIG. 35 is a view showing image data read by the present invention.

FIG. 35 shows a state of the image data read by the image pickup camera unit 2 having the above-mentioned construction. In FIG. 35, "a" denotes a document surface image, "b" denotes a document table image, "e" denotes a document position alignment reference, and "f" denotes an image of the distance measuring plate 8. The document surface image "a" is read as an image curved vertically due to a variation in height of the document. The document surface is illuminated by the illuminating unit 3, and therefore it is read totally brightly. In contrast to the above, the document table 1 and the distance measuring plate 8 colored more thickly than the document ground reflects a smaller quantity of light, and therefore they are read darkly.

Figure 36:
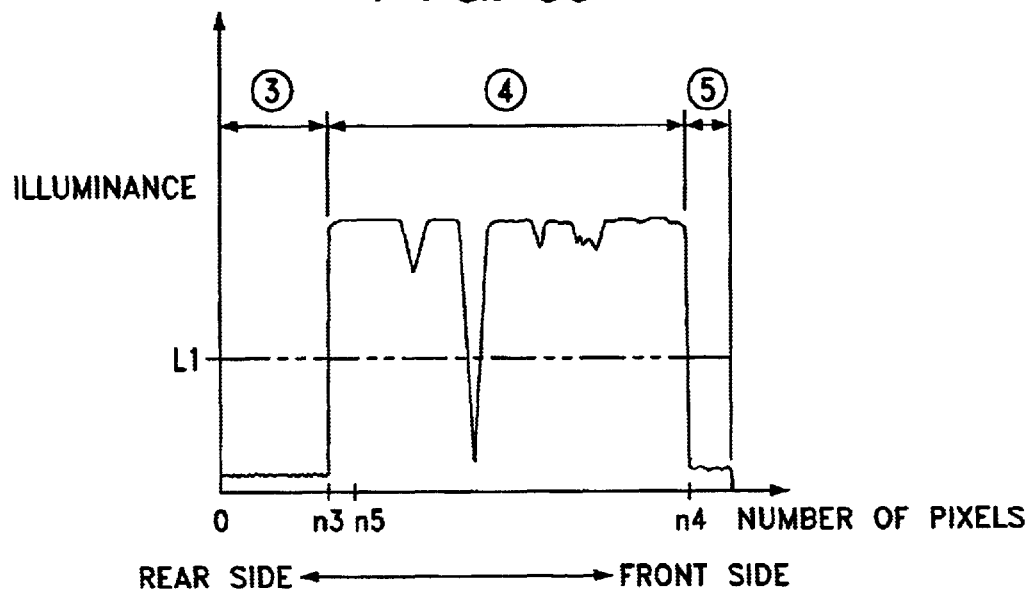
FIG. 36 is a view showing an exemplified output of one line in the main scanning direction of a CCD line sensor of the present invention.

FIG. 36 shows an exemplified output of one line in the main scanning direction of the CCD line sensor 7. The number of pixels of the line sensor 7 (left: rear side, right: front side) is plotted in the axis of abscissas, while a sensor surface illuminance is plotted in the axis of ordinates. An interval (3) represents the portion of the distance measuring plate 8, an interval (4) represents the document surface portion, and an interval (5) represents the document table portion. There are further denotations of: L1 representing an illuminance threshold value; n3 and n4 representing the minimum and maximum values of the number of pixels exceeding the threshold value L1; and n5 representing a pixel (fixed) corresponding to the document position alignment reference. Values of (n5−n3) and (n4−n5) represent the number of pixels corresponding to the height of the document used by the distance measuring means.

Figure 37:
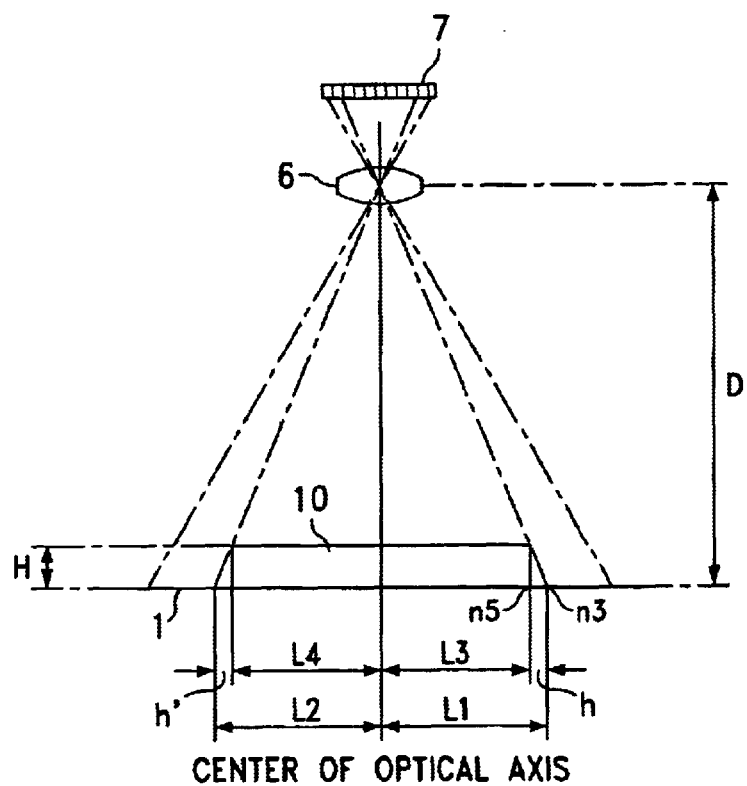
FIG. 37 is a view for explaining a document height measuring method of the present invention.

Next, a document height measuring method of the present embodiment will be described with reference to FIG. 37. When the CCD line sensor 7 moves in the sub-scanning direction (the lateral direction of the document, i.e., a direction perpendicular to the surface of the sheet of FIG. 37), the value of n3 varies, so that a variation in number of pixels relevant to the height can be obtained in the lateral direction of the document. By calculating the number of pixels by use of a coefficient depending on the image pickup optical system, height data can be obtained.

$$H = \frac{D \times (n5 - n3)}{L3 + (n5 - n3)} \qquad (4)$$

where H is the height, D is a distance from the center of the lens to the document table, L3 is a distance from the center of the optical axis to the position alignment reference. L1, L2 and L4 will be described hereinafter.

Figure 38:
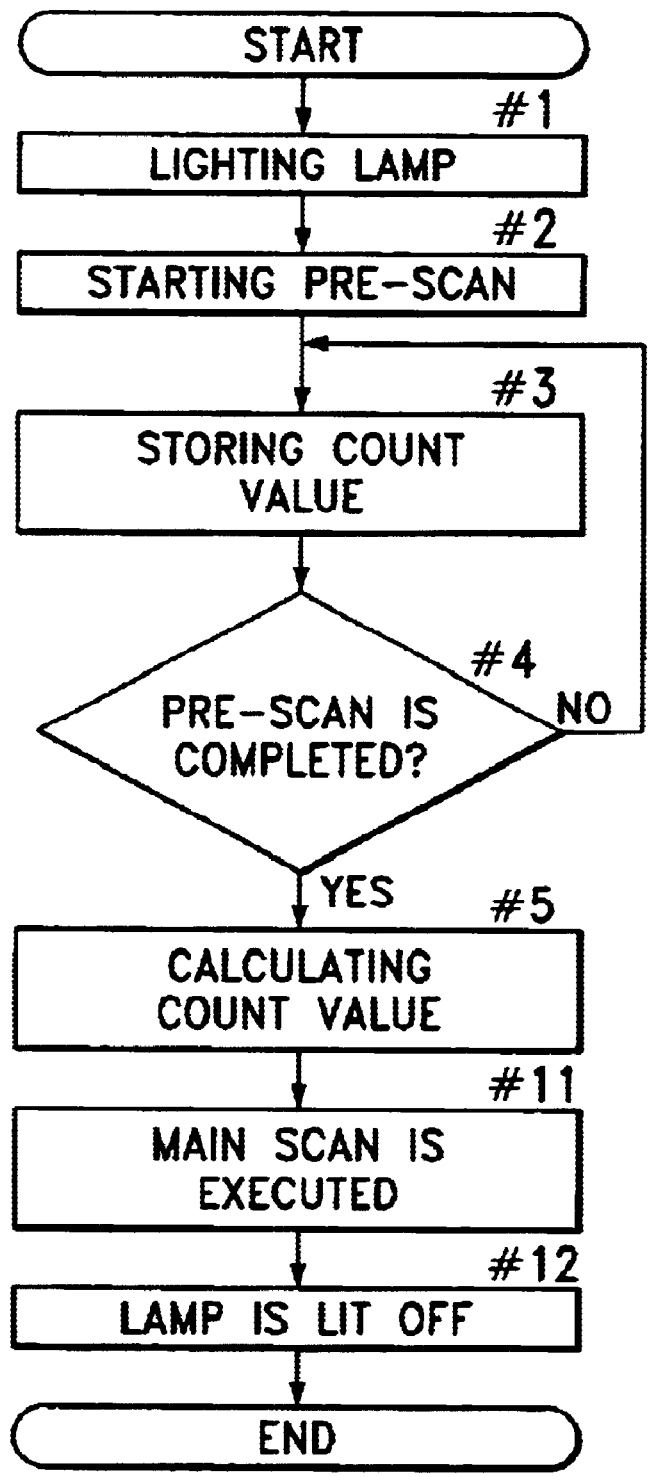
FIG. 38 is a flowchart showing a reading operation of the present invention.

The circuit construction for controlling the apparatus of the present embodiment is the same as that of FIG. 7 described above, and therefore no description is provided therefor herein. FIG. 38 is a flowchart of a reading operation of the apparatus of the present embodiment. When a reading operation start command is inputted, the CPU 23 makes the lamp of the illuminating unit 3 light via the lamp controlling unit 27 (step #1) to illuminate the document 10. Then, a pre-scan is started (step #2) to execute a document shape measuring operation. This operation is executed by scanning the upper end portion of the document and the document on the document table while moving the CCD line sensor 7 from one end, counting a specified number of pixels in a manner as described above, and storing the count value into the memory 28 (step #3). The above-mentioned operation is repeated at a specified time interval until the pre-scan is completed (YES at step #4), so that a distribution of the number of pixels at the edge of the side surface in the lateral direction of the document and a distribution of the number of pixels at the edge of the surface of the document can be obtained (step #5). When the above-mentioned operation is completed, the CCD line sensor 7 is scanned in a direction reverse to that of the pre-scan to execute the main scan for picking up the image of the document (step #11). Finally, the lamp is lit off (step #12), and the image reading operation ends.

Figure 39:
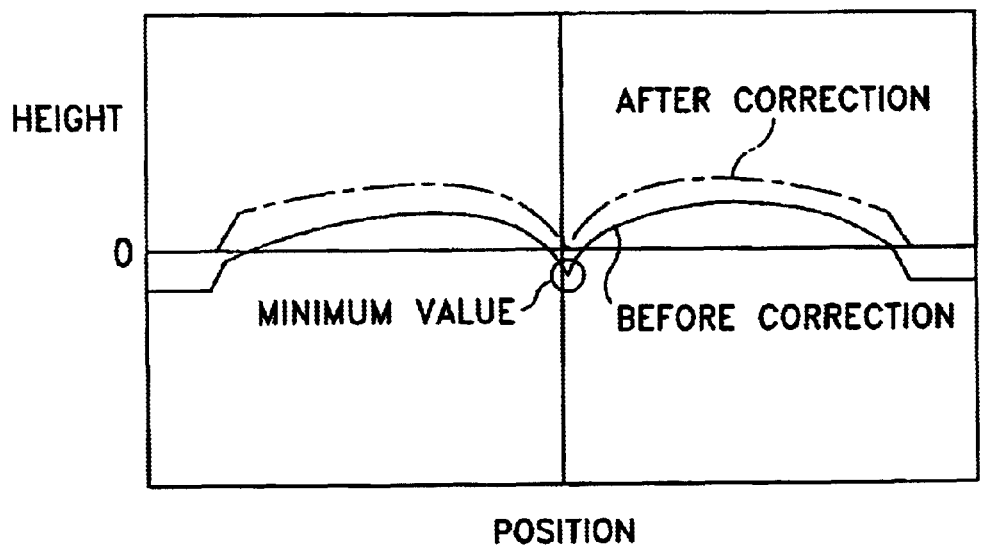
FIG. 39 is a view showing a measurement result by the present invention.

According to the above-mentioned distance measuring method, a displacement of the edge of the document surface is detected and converted into height data. Therefore, when an offset or inclination from the position adjustment reference of the document occurs, accordingly the position of the document surface moves, causing the problem that the movement cannot be discriminated from the displacement of the edge due to the variation of height. Such an offset or inclination of the document occurs when the operator makes a mistake in placing the document. The problem may take place, for example, in the case of a hard-cover book having a cover greater in size than its pages, where the stepped portion inevitably results in an offset. A document offset correcting method will be described below. When the document surface is separated from the distance measuring plate 8, the value of n3 increases, and the height of the document becomes smaller than the actual value thereof when measured. In such a case, as shown in FIG. 39, portions existing in the right and left pages of the document at a level of "0 mm" appear as height data of negative values. However, such a phenomenon never occurs practically. Therefore, when negative height data is produced, it can be judged that the offset of the document is occurring. When the document is put apart approximately in parallel with the distance measuring plate 8, the variation of height data takes place uniformly throughout the document. Therefore, by detecting the minimum value of the negative height data and shifting all the data of the document so that the value becomes "0 mm", the abnormality due to the offset of the document can be corrected.

Figure 40:
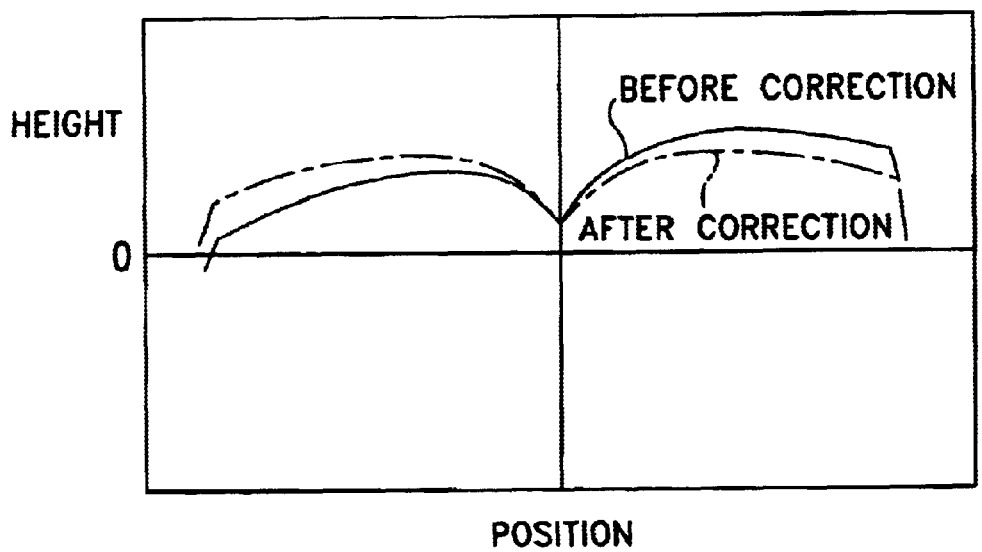
FIG. 40 is a view showing a measurement result by the present invention.

Next, an inclination correcting method will be described. When the document inclines as shown in FIG. 40, either of the right and left corner portions located at the upper end of the document surface is put apart from the distance measuring plate 8, and accordingly the measurement results as if the height of the document gradually reduces in a direction in which the document surface is put apart. This phenomenon can be considered equivalent to the fact that the offset amount of the document varies linearly through distance measuring positions. Therefore, by detecting the inclination angle of the entire document and calculating the offset amount at each distance measuring position, the height of the document can be corrected. When the document inclines, the lower edge of the document surface varies similarly to the upper edge. Therefore, by detecting the number of pixels at both the edges, the amount of inclination of the document can be detected.

Figure 41:
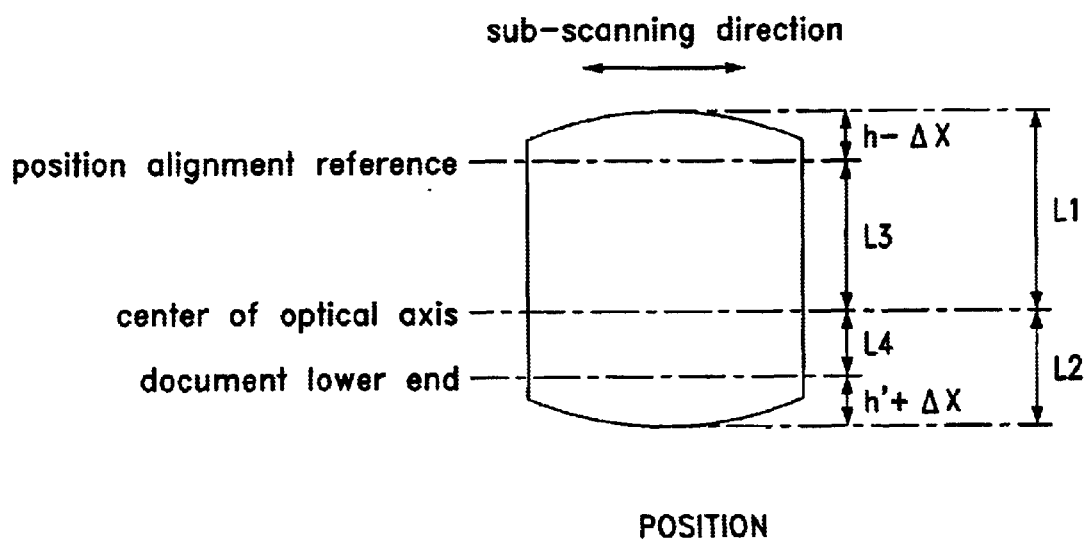
FIG. 41 is a view showing a correction for inclination by the present invention.

Detection of the amount of inclination and a height data correcting method will be described below. FIG. 41 shows an outline of a read image of one page of a book document. In FIGS. 41 and 37, assuming that L1 (measured value) represents a distance from the center of the optical axis to the edge of the upper end of the document, L2 (measured value) represents a distance from the center of the optical axis to the edge of the lower end of the document, L3 (standard value) represents a distance from the center of the optical axis to the position alignment reference, L4 (unknown value) represents a distance from the center of the optical axis to the lower end of the document at a height of θ0 mm, h and h' (unknown value) represent amounts of deviation due to the offset of the document from the center of the optical axis at a height of H, and ΔX (unknown value) represents the maximum amount of offset of the corner portion from the position alignment reference due to an inclination of the document (deviated frontward in the present example), these values can be expressed by relational expressions as follows.

$$L1 = h + L3 - \Delta X \quad (5)$$

$$\text{from } L2 = h' + L4 + \Delta X,\ h/L3 = h'/L4,\ L2 = h \times L4/L3 + L4 + \Delta X \quad (6)$$

Since there are three unknown values and two relational expressions, no solution can be obtained in this condition. In view of the above, it is assumed that, because the operator presses the document against the stopper in the center portion (bound portion) of the document, a displacement due to the inclination hardly occurs (ΔX=0), and the distance L4 of the center portion is obtained from the aforementioned two equations. The distance L4 has a relation with the document size, and is constant regardless of the position in the lateral direction and the height of the document. Therefore, by substituting the value L4 into the aforementioned two equations, the offset amount ΔX at each distance measuring point in the sub-scanning direction can be obtained. By adding the value ΔX due to the inclination to the number of pixels of the edge of the upper end of the document, the variation in height due to the inclination of the document can be corrected. It is to be noted that, when the calculation is actually executed, the value ΔX does not always vary linearly due to measurement and calculation errors and other factors. In such a case, it is possible to obtain an average value of ΔX at every measuring point for each of the right and left pages, determine the obtained value as the displacement due to the inclination at the center of the right and left pages, and obtain the amount of displacement at each measuring point by a proportional calculation according to a distance from the bound portion. By so doing, erroneous correction due to a slight fluctuation of ΔX can be corrected.

Figure 42:
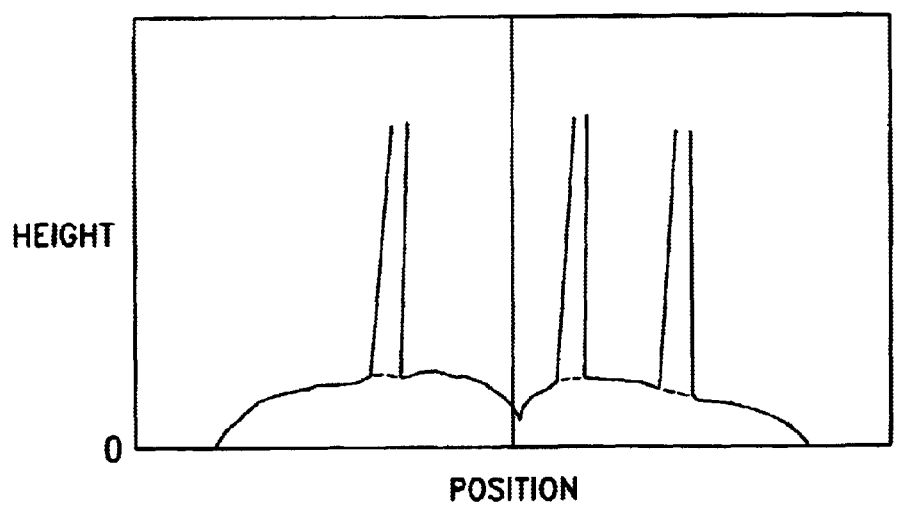
FIG. 42 is a view showing a measurement result by the present invention.

According to the aforementioned distance measuring method, it is judged that the document surface is "white", while the document table 1 and the distance measuring plate 8 are "black" in obtaining the height data. Therefore, if a portion having a similar brightness exists at the boundary, an error may occur. For instance, when a tag or the like is attached to an upper portion of the book, the portion is judged to be white, and a burst-like discontinuous portion takes place in the height data as shown in FIG. 42. In such a case, by taking a difference between adjacent data of portions across the discontinuous portion and, by use of the characteristic of direction and the variation of values of the difference, the portion can be removed. It is to be noted that the present invention is not limited to the construction of any of the aforementioned embodiments, and there may be a variety of modifications within the scope of the present invention.

What is claimed is:

1. An image reading apparatus comprising:

a document table on which a document is placed, the image on the document to be read facing away from the document table;

an image reading means which reads out an image of the document placed on the document table;

a height detecting means which detects a height of the document placed on the document table;

an outline measuring means which measures an outline of the document placed on the document table; and an examining means which examines a size of the document based on the height of the document detected by the height detecting means and the outline of the document measured by the outline measuring means, wherein the height detecting means has a mirror for reflecting a document upper end side surface and detects the height of the document based on an image of the document upper end side surface reflected on the mirror.

2. The image reading apparatus of claim 1 wherein the mirror is at a 45° angle to the document table.

3. An image reading apparatus comprising:
- a document table on which a document is placed, the image on the document to be read facing away from the document table;
- an image reading means which reads out an image of the document placed on the document table;
- a height detecting means which detects a height of the document placed on the document table;
- an outline measuring means which measures an outline of the document placed on the document table; and
- an examining means which examines a size of the document based on the height of the document detected by the height detecting means and the outline of the document measured by the outline measuring means,
- wherein the height detecting means has a mirror for reflecting a document lower end side surface and detects the height of the document based on an image of the document lower end side surface reflected on the mirror.

4. The image reading apparatus of claim 3 wherein the mirror is at a 45° angle to the document table.

5. An image reading apparatus comprising:
- a document table on which a document is placed, the image on the document to be read facing away from the document table;
- an image reading means which reads out an image of the document placed on the document table;
- a height detecting means which detects a height of the document placed on the document table;
- an outline measuring means which measures an outline of the document placed on the document table; and
- an examining means which examines a size of the document based on the height of the document detected by the height detecting means and the outline of the document measured by the outline measuring means,
- wherein the height detecting means detects the height of the document based on a detection of an edge of an upper end portion of the document.

6. An image reading apparatus comprising:
- a document table on which a document is placed, the image on the document to be read facing away from the document table;
- an image reading means which reads out an image of the document placed on the document table;
- a height detecting means which detects a height of the document placed on the document table;
- an outline measuring means which measures an outline of the document placed on the document table; and
- an examining means which examines a size of the document based on the height of the document detected by the height detecting means and the outline of the document measured by the outline measuring means,
- wherein the height detecting means detects the height of the document based on a detection of an edge of a lower end portion of the document.

7. An image reading apparatus comprising:
- a document table on which a document is placed with the image on the document to be read facing away from the document table;
- an image reading means which reads out an image of the document placed on the document table;
- a height detecting means which detects a height orthogonal to a reference plane on the document table of at least one edge of the document placed on the document table;
- a document position recognizing means which recognizes a position of the document placed on the document table relative the reference plane;
- a height correction means which corrects the height of the document detected by the height detecting means in accordance with the position of the document recognized by the document position recognizing means; and
- an image processing means which processes the image read by the image reading means in accordance with the height of the document corrected by the height correcting means.

8. An image reading apparatus as defined in claim 7, wherein the height detecting means mirror is for reflecting a document upper end side surface and detects the height of the document based on an image of the document upper end side surface reflected on the mirror.

9. An image reading apparatus as defined in claim 7, wherein the height detecting means mirror is for reflecting a document lower end side surface and detects the height of the document based on an image of the document lower end side surface reflected on the mirror.

10. An image reading apparatus as defined in claim 7, wherein the height detecting means detects the height of the document based on a detection of an edge of an upper end portion of the document.

11. An image reading apparatus as defined in claim 7, wherein the height detecting means detects the height of the document based on a detection of an edge of a lower end portion of the document.

12. An image reading apparatus as defined in claim 7, wherein the height correcting means corrects the height in case that the position of the document is apart from a reference position by a predetermined value.

13. An image reading apparatus as defined in claim 7, wherein the height detecting means detects the height of the document based on a detection of an edge of a upper end portion of the document,
- and the height correcting means corrects the height of the document based on the minimum value of edge data detected by the height detecting means.

14. An image reading apparatus as defined in claim 13, wherein the height correcting means corrects the height of the document in case that the minimum value of the edge data detected by the height detecting means is smaller than a predetermined reference value.

15. The image reading apparatus of claim 7 wherein said height detecting means includes a mirror for reflecting a document end side surface and for detecting the height of the document based on the image of the document end side surface reflected on the mirror.

16. The image reading apparatus of claim 15 wherein the image of the document end side surface reflected in the mirror is above a first threshold value but below a second threshold value, the image of the document to be read being above the second threshold value.

17. The image reading apparatus of claim 15 wherein the mirror is at a 45° angle to the document table.

18. An image reading apparatus comprising:
- a document table on which a document is placed with the image to be read facing away from the document table;
- an image reading apparatus which reads an image of the document placed on the document, the document located between the image reading apparatus and the document;
- an image distortion detecting means which detects a degree of a distortion of the image read by the image reading means;

a correcting means which corrects the distortion of the image read by the image reading means in accordance with the degree of the image distortion detected by the image distortion detecting means;

a judging means which judges whether or not the degree of the image distortion detected by the image distortion detecting means is within a correctable range; and a processing means which executes predetermined operations in case that it is judged that the degree of the image distortion is not within the correctable range by the judging means.

19. An image reading apparatus as defined in claim 18, wherein the processing means issues an alarm.

20. An image reading apparatus as defined in claim 18, wherein the image distortion detecting means detects an image distortion by detecting a shape of the document placed on the document table.

21. An image reading apparatus as defined in claim 20, wherein the image distortion detecting means have a mirror for reflecting a document upper end side surface and detects the shape of the document based on an image of the document upper end side surface reflected on the mirror.

22. An image reading apparatus as defined in claim 20, wherein the image distortion detecting means have a mirror for reflecting a document lower end side surface and detects the shape of the document based on an image of the document lower end side surface reflected on the mirror.

23. The image reading apparatus of claim 22 wherein the mirror is at a 45° angle to the document table.

24. An image reading apparatus as defined in claim 18, wherein the processing means inhibits reading operation.

25. The image reading apparatus as defined in claim 18 wherein the correctable range is 60° or less.

26. An image reading apparatus comprising:

a document table on which a document having edges is placed, the image on the document to be read facing away from the document table;

an image reading means which reads out an image of the document placed on the document table;

a height detecting means which detects a height orthogonal to a reference plane on the document table of at least one edge of the document placed on the document table;

a perimeter outline measuring means which measures a perimeter outline of the document placed on the document table by identifying the position of multiple non-parallel edges of the document on the document table relative to said reference plane; and an examining means which examines a size of the document based on the height of the document detected by the height detecting means and the outline of the document measured by the outline measuring means.

27. The image reading apparatus of claim 26 wherein the document table has a surface contrasting with the document, the height detecting means having a mirror for reflecting a document end side surface and detecting the height of the document based on an image of the document end side surface reflected on the mirror contrasting with a portion of the surface of the document table reflected on the mirror.

28. The image reading apparatus of claim 26 wherein the height detecting means detects the height of the document based on a detection of an edge of an end portion of the document.

29. An image reading apparatus comprising:

a document table on which a document having edges is placed with the image on the document to be read facing away from the document table;

an image reading means which reads out an image of the document placed on the document table;

a height detecting means which detects a height orthogonal to a reference plane on the document table of at least one edge of the document placed on the document table;

a document position recognizing means which recognizes a position of the document placed on the document table relative to a reference line defining the desired position of one edge of the document, the reference line lying in the reference plane;

a height correcting means which corrects the height of the document detected by the height detecting means in accordance with the position of the document recognized by the document position recognizing means; and an image processing means which processes the image read by the image reading means in accordance with the height of the document corrected by the height correcting means.

30. The image reading apparatus of claim 29 where in the document table has a surface contrasting with the document, the height detecting means having a mirror for reflecting a document end side surface and detecting the height of the document based on an image of the document end side surface reflected on the mirror contrasting with a portion of the surface of the document table reflected on the mirror.

31. The image reading apparatus of claim 29 wherein the height detecting means detects the height of the document based on a detection of an edge of an end portion of the document.

32. An image reading apparatus comprising:

a document table on which a document is placed, the image on the document to be read facing away from the document table;

an image reading means which reads out an image of the document placed on the document table;

a height detecting means which detects a height H orthogonal a reference plane on the document table along a main scanning direction for a plurality of points on a first edge of the document placed on the document table;

outline measuring means which measures an outline of the document placed on the document table at a plurality of points lying on a perimeter of the document, the position of each point being projected onto the reference plane to intersect the reference plane at coordinates X+ΔX and Y+ΔY on the reference plane; and an examining means which examines a size of the document based on the height of the document detected by the height detecting means and the outline of the document measured by the outline measuring means and a distance L from the image reading means to the document table by determining the actual coordinates X, Y of each point on the perimeter outline by utilizing the following equations:

$$\Delta X = (H \times X) \div (L-H)$$

and $$\Delta Y = (H \times Y) \div (L-H).$$

33. An image reading apparatus comprising:

a document table on which a document is placed, the image on the document to be read facing away from the document table and the document having edges;

an image reading means which reads out an image of the document placed on the document table;

a height detecting means which detects a height of the document placed on the document table;

an outline measuring means which measures an outline of the document placed on the document table, said outline being a shape formed by connecting points of intersection on the document table intersected by lines connecting the image reading means, the edges of the document and the document table; and an examining means which examines a size of the document based on the height of the document detected by the height detecting means and the outline of the document measured by the outline measuring means.

* * * * *

UNITED STATES PATENT AND TRADEMARK OFFICE
CERTIFICATE OF CORRECTION

PATENT NO. : 6,687,420 B1
DATED : February 3, 2004
INVENTOR(S) : Shinya Matsuda et al.

It is certified that error appears in the above-identified patent and that said Letters Patent is hereby corrected as shown below:

Title page,
Item [54] and Column 1, line1,
Title, delete "IMAGE READING APPARATUS", and insert -- IMAGE READING APPARATUS FOR DETECTING EDGES AND CORRECTING FOR VARIED HEIGHT OF A DOCUMENT BEING READ --.
Item [57], ABSTRACT,
Line 2, delete "a image", and insert -- an image --.
Line 5, delete the first occurrence of "a".

Column 1,
Line 14, after "Conventionally.". Insert -- with --
Line 15, after "read", delete "with".
Line 19, after "Also,", insert -- with --.
Line 20, delete "with".
Line 33 and 34, delete "No.60-154869", and insert -- No. 60-154869 --.
Line 36, delete "know", and insert -- known --.
Line 42, delete "with".
Lines 45, 55 and 61, delete "can not", and insert -- cannot --.

Column 2,
Line 9, after the first occurrence of "of". Insert -- the --.
Line 14, after "objects", delete ",".
Lines 42 and 54, delete "not".
Lines 42 and 55, delete "correctly", and insert -- incorrectly --.

Column 3,
Line 13, delete "FIG. 6is", and insert -- FIG. 6 is --.
Line 34, delete "an".

Column 4,
Line 18, delete "Invention.", and insert -- invention. --.
Line 59, after "document", delete ",".

Column 5,
Line 1, delete "Image", and insert -- image --.
Line 64, "delete "It Is", and insert -- It is --.

UNITED STATES PATENT AND TRADEMARK OFFICE
CERTIFICATE OF CORRECTION

PATENT NO. : 6,687,420 B1
DATED : February 3, 2004
INVENTOR(S) : Shinya Matsuda et al.

It is certified that error appears in the above-identified patent and that said Letters Patent is hereby corrected as shown below:

Column 6,
Lines 13 and 14, delete "mirror 5 colored more thickly", and insert -- mirror 5 is darker --.
Lines 48 and 49, delete "process every line", and insert -- process for every line --.

Column 7,
Line 16, delete "In", and insert -- in --.
Line 22, after "then", delete ",".
Line 23, delete "how much", and insert -- to what --.
Lines 40 and 45, "that the".
Line 54, delete "the".
Line 48, delete the first occurrence of "the".
Line 51, delete the second occurrence of "the".
Line 56, delete "lit", and insert -- turned --.

Column 8,
Line 15, after "6", delete "and" and insert -- , --
Line 36, (the third line of formula (1)), delete "L – H", and insert -- L – H, --.
Line 42, (the third line of formula (2)), delete "L – H", and insert -- L – H, --.

Column 9,
Lines 41 and 42, delete "of a front surface. a side surface and a top surface", and insert -- (a front surface, a side surface, and a top surface) --.

Column 10,
Line 54, delete "with".
Line 56, delete "the", and insert -- a --.
Line 57, delete "as the result that", and insert -- if --.
Line 58, delete "as described".
Line 58, after "will", insert -- now --.
Line 61, delete "naturally".
Line 62, delete the first occurrence of "the".
Line 62, after "center", insert -- a --.
Line 62, delete "book".
Line 63, after "of", delete "book documents", and insert -- books --.
Line 65, delete "to the operator".
Line 67, delete "with his fingers".

UNITED STATES PATENT AND TRADEMARK OFFICE
CERTIFICATE OF CORRECTION

PATENT NO. : 6,687,420 B1
DATED : February 3, 2004
INVENTOR(S) : Shinya Matsuda et al.

It is certified that error appears in the above-identified patent and that said Letters Patent is hereby corrected as shown below:

Column 11,
Line 5, at the beginning of the sentence, delete "the book".
Line 5, delete the second occurrence of "document".
Line 39, after "positions", delete "," and insert -- . --.
Line 40, delete the second occurrence of "22(b)" and insert -- 23(b) --.
Line 42, after "lowered", delete ", and". and insert -- . --.

Column 12,
Line 8, delete "an", and insert -- any --.
Line 59, delete "Judges", and insert -- judges --.
Line 62, after "60°", insert -- , --.

Column 13,
Line 35, delete "lit", and insert -- turned --.
Line 9, delete "Judging", and insert -- judging --.

Column 14,
Line 5, delete "by both his hands, the", and insert -- with both hands. The --.
Line 10, after "aslant", delete ".", and insert -- , --.
Line 36, delete "with".
Line 40, after "which", insert -- the --.
Line 41, after "flat", insert -- , --.
Line 43, delete "of the image", and insert -- of, --.
Line 55, delete the second occurrence of "the".
Line 56, delete "the".

Column 15,
Line 67, delete "totally" and insert -- fully --.

Column 16,
Line 1, after "8", insert -- darker --.
Line 3, delete "they".
Line 35, after "table,", insert -- and --.
Line 43, delete "inputted", and insert -- input --.
Line 62, delete "lit", and insert -- turned --.

UNITED STATES PATENT AND TRADEMARK OFFICE
CERTIFICATE OF CORRECTION

PATENT NO. : 6,687,420 B1
DATED : February 3, 2004
INVENTOR(S) : Shinya Matsuda et al.

It is certified that error appears in the above-identified patent and that said Letters Patent is hereby corrected as shown below:

<u>Column 17,</u>
Line 1, delete "accordingly".
Line 29, delete "end", and insert -- ends --.
Line 30, delete "document surface is" and insert -- document's surfaces are --.
Line 55, delete "θ".

<u>Column 20,</u>
Line 35, delete the second instance of "a", and insert -- an --.

Signed and Sealed this

Seventeenth Day of August, 2004

JON W. DUDAS
*Acting Director of the United States Patent and Trademark Office*